US011606808B2

(12) United States Patent
Khoshnevisan et al.

(10) Patent No.: US 11,606,808 B2
(45) Date of Patent: Mar. 14, 2023

(54) CROSS-CARRIER SCHEDULING IN THE PRESENCE OF MULTI-DOWNLINK CONTROL INFORMATION (DCI)(MULTI-DCI) BASED MULTI-TRANSMIT-RECEIVE POINT (MTRP)

(71) Applicant: QUALCOMM Incorporated, San Diego, CA (US)

(72) Inventors: Mostafa Khoshnevisan, San Diego, CA (US); Peter Gaal, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/307,462

(22) Filed: May 4, 2021

(65) Prior Publication Data
US 2021/0360679 A1 Nov. 18, 2021

Related U.S. Application Data

(60) Provisional application No. 63/025,824, filed on May 15, 2020.

(51) Int. Cl.
*H04W 72/02* (2009.01)
*H04W 72/04* (2009.01)
(Continued)

(52) U.S. Cl.
CPC ....... *H04W 72/1289* (2013.01); *H04L 1/0069* (2013.01); *H04L 1/1819* (2013.01);
(Continued)

(58) Field of Classification Search
CPC ......... H04W 72/1289; H04W 72/0493; H04W 72/02; H04L 1/0069; H04L 1/1819; H04L 1/1896
See application file for complete search history.

(56) References Cited

U.S. PATENT DOCUMENTS

2020/0119869 A1* 4/2020 Taherzadeh Boroujeni ................
 H04B 7/0695
2020/0305134 A1* 9/2020 Noh ..................... H04W 72/042
(Continued)

OTHER PUBLICATIONS

International Search Report and Written Opinion—PCT/US2021/030887—ISA/EPO—dated Aug. 19, 2021 17 pages.
(Continued)

*Primary Examiner* — Kent Krueger
(74) *Attorney, Agent, or Firm* — The Marbury Law Group/QUALCOMM

(57) ABSTRACT

Embodiments include systems and method for enabling cross-carrier scheduling in the presence of multi-downlink control information (DCI) (multi-DCI) based multi-transmit-receive point (MTRP). Various aspects include methods performed by a processor of a wireless device for managing cross-carrier scheduling. Various aspects may include determining whether a scheduling cell is configured to perform cross-carrier scheduling for a scheduled cell, determining a Control Resource Set (CORESET) Pool Index (CORESET-PoolIndex) value of the scheduling cell 1 in response to determining that the scheduling cell is configured to perform cross-carrier scheduling for the scheduled cell, and associating the scheduled cell with the determined CORESET-PoolIndex value of the scheduling cell.

30 Claims, 25 Drawing Sheets

CC0: Two values of CORESETPoolIndex are configured

CC1: Only CORESETPoolIndex=0 is configured or CORESETPoolIndexis not configured

CC2: Only CORESETPoolIndex=1 is configured

CC3: X-carrier scheduled by CC1 (no CORESET is configured)

CC4: X-carrier scheduled by CC2 (no CORESET is configured)

S0= (CC0,CC1,CC3)  S1= (CC0,CC2,CC4)
HARQ-Ack for S0   HARQ-Ack for S1

(51) Int. Cl.
  *H04L 1/18* (2006.01)
  *H04W 72/12* (2023.01)
  *H04L 1/00* (2006.01)
  *H04L 1/1812* (2023.01)
  *H04L 1/1867* (2023.01)

(52) U.S. Cl.
  CPC ........... *H04L 1/1896* (2013.01); *H04W 72/02* (2013.01); *H04W 72/0493* (2013.01)

(56) References Cited

U.S. PATENT DOCUMENTS

| | | | |
|---|---|---|---|
| 2020/0351129 A1* | 11/2020 | Kwak | H04W 72/0493 |
| 2021/0050955 A1* | 2/2021 | Park | H04L 1/1614 |
| 2021/0250944 A1* | 8/2021 | Ji | H04L 5/0055 |
| 2022/0167389 A1* | 5/2022 | Kim | H04B 7/024 |
| 2022/0174708 A1* | 6/2022 | Kim | H04W 72/1289 |

OTHER PUBLICATIONS

ZTE: "Enhancements on Multi-TRP and Multi-panel Transmission", 3GPP Draft, 3GPP TSG RAN WG1 #98bis, R1-1910284 Enhancements on Multi-TRP and Multi-Panel Transmission, 3rd Generation Partnership Project (3GPP), Mobile Competence Centre, China, Oct. 14, 2019-Oct. 20, 2019, 20 Pages, Oct. 5, 2019, XP051808478, Retrieved from the Internet: URL: https://ftp.3gpp.org/tsg_ran/WG1_RL1/TSGR1_98b/Docs/R1-1910284.zip R1-1910284 Enhancements on Multi-TRP and Multi-panel Transmission.docx, pp. 7-8.

ZTE: "Enhancements on Multi-TRP and Multi-panel Transmission", 3GPP Draft, 3GPP TSG RAN WG1 #99, R1-1911930, 3rd Generation Partnership Project (3GPP), Mobile Competence Centre, France, vol. RAN WG1, No. Reno, USA, Nov. 18, 2019-Nov. 22, 2019, Nov. 9, 2019, pp. 1-14, XP051823111, Retrieved from the Internet: URL: https://ftp.3gpp.org/tsg_ran/WG1_RL1/TSGR1_99/Docs/R1-1911930.zip. R1-1911930 Enhancements on Multi-TRP and Multi-panel Transmission.docx, figures 2.2-2 section 2.2.

* cited by examiner

Case 1 — Impact on HARQ-Ack
CORESETPool Index=0 / TRP0     CORESETPool Index=1 / TRP1
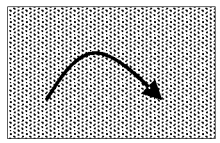 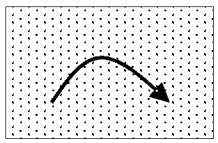
CC0: Two values of CORESETPoolIndex are configured
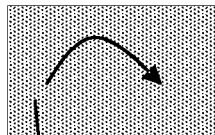
CC1: Only CORESETPoolIndex=0 is configured or CORESETPoolIndex is not configured
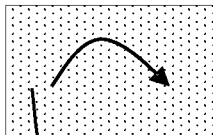
CC2: Only CORESETPoolIndex=1 is configured
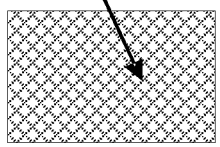
CC3: X-carrier scheduled by CC1 (no CORESET is configured)
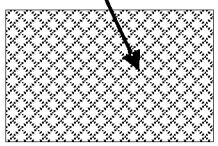
CC4: X-carrier scheduled by CC2 (no CORESET is configured)
FIG. 5A Case 2
CORESETPool    CORESETPool
Index=0 / TRP0  Index=1 / TRP1
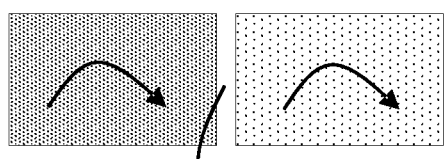
CC0: Two values of
CORESETPoolIndex are configured
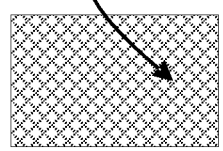
CC1: X-carrier scheduled by CC0 (no
CORESET is configured)
FIG. 5B

```
CrossCarrierSchedulingConfig    ::= SEQUENCE {
    schedulingCellInfo    CHOICE {
        own SEQUENCE    {              --Cross carrier scheduling: scheduling cell
            cif-Presence BOOLEAN
        },
        other SEQUENCE {               -- Cross carrier scheduling: scheduled cell
            schedulingCellId ServCellIndex
            cif- InSchedulingCell INTEGER (1..7)
            associatedCORESETPoolIndexValue Integer (0,1,2)    ←—952
        }
    },
    ...
}
```
950

FIG. 9B

CORESETPool   CORESETPool
Index=0 / TRP0  Index=1 / TRP1

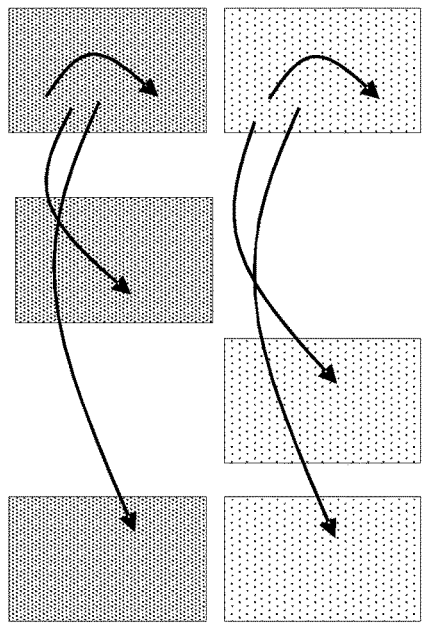

CC0: Two values of
CORESETPoolIndex are configured

CC1: X- carrier scheduled by CC0 (no
    CORESET is configured); associated with
CORESETPoolIndex=0 (Alt1/2/3)

CC2: X- carrier scheduled by CC0 (no
    CORESET is configured); associated with
CORESETPoolIndex=1 (Alt2/3)

CC3: X- carrier scheduled by CC0 (no
    CORESET is configured); associated with
both CORESETPoolIndexvalues (Alt3)

S0= (CC0,CC1,CC3)   S1= (CC0,CC2,CC3)

HARQ-Ack for S0   HARQ-Ack for S1

FIG. 11

CROSS-CARRIER SCHEDULING IN THE PRESENCE OF MULTI-DOWNLINK CONTROL INFORMATION (DCI)(MULTI-DCI) BASED MULTI-TRANSMIT-RECEIVE POINT (MTRP)

This application claims the benefit of priority to U.S. Provisional Application No. 63/025,824, entitled "Cross-Carrier Scheduling In The Presence Of Multi-DCI Based MTRP" filed May 15, 2020, the entire contents of which are hereby incorporated herein by reference for all purposes.

BACKGROUND

Long Term Evolution (LTE), Fifth Generation (5G) new radio (NR) (5GNR), and other recently developed communication technologies allow wireless devices to communicate information at data rates (e.g., in terms of Gigabits per second, etc.) that are orders of magnitude greater than what was available just a few years ago. Today's communication systems are also more secure, resilient to multipath fading, allow for lower network traffic latencies, and provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

Communication systems may be configured to employ carrier aggregation (CA) to provide sufficient bandwidth to support high data rate communications. A CA system combines bandwidth from distinct frequency bands, each referred to as a component carrier. Each component carrier may be scheduled differently. For example, component carriers for downlink control information, downlink data, uplink control information, and uplink data may each be scheduled independently, referred to as cross-carrier scheduling.

SUMMARY

Various aspects include systems and methods for managing cross-carrier scheduling in the presence of multi-downlink control information (DCI) (multi-DCI) based multi-transmit-receive point (MTRP). Various aspects include methods performed by a processor of a wireless device for managing cross-carrier scheduling. Various aspects may include receiving DCI from a scheduling cell that schedules a communication on a scheduled cell, transmitting the communication or monitoring for the communication on the scheduled cell based on the DCI, and performing Type-1 hybrid automatic repeat request (HARQ) acknowledgement (HARQ-ACK) operations for the communication based on one or more Control Resource Set (CORESET) pools configured for the scheduled cell.

Some aspects may further include receiving a cross-carrier scheduling configuration of the scheduling cell indicating the one or more CORESET pools.

In some aspects, in response to the cross-carrier scheduling configuration indicating two CORESET pools, performing Type-1 HARQ-ACK operations for the communication based on the one or more CORESET pools configured for the scheduled cell may include performing Type-1 HARQ-ACK operations for the communication on a first CORESET pool including the scheduled cell based on a CORESET pool of the scheduling cell being indicated as the first CORESET pool, or performing Type-1 HARQ-ACK operations for the communication on a second CORESET pool including the scheduled cell based on the CORESET pool of the scheduling cell being indicated as the second CORESET pool.

In some aspects, in response to the cross-carrier scheduling configuration indicating two CORESET pools of the scheduling cell, performing Type-1 HARQ-ACK operations for the communication based on the one or more CORESET pools configured for the scheduled cell may include performing Type-1 HARQ-ACK operations for the communication on a first CORESET pool of the two CORESET pools based on the first CORESET pool being a default CORESET pool, the first CORESET pool including the scheduled cell.

In some aspects, in response to the cross-carrier scheduling configuration indicating two CORESET pools of the scheduling cell and a selected CORESET pool of the two CORESET pools associated with the scheduled cell, performing Type-1 HARQ-ACK operations for the communication based on the one or more CORESET pools configured for the scheduled cell may include performing Type-1 HARQ-ACK operations for the communication on the selected CORESET pool based on the indication in the cross-carrier scheduling configuration, the selected CORESET pool including the scheduled cell.

In some aspects, in response to the cross-carrier scheduling configuration indicates two CORESET pools of the scheduling cell and an association of the schedule cell with both CORESET pools, performing Type-1 HARQ-ACK operations for the communication based on the one or more CORESET pools configured for the scheduled cell may include performing Type-1 HARQ-ACK operations for the communication on both CORESET pools based on the indication in the cross-carrier scheduling configuration of the association with both CORESET pools, both CORESET pools including the scheduled cell.

Some aspects may further include handling the schedule cell as a multi-DCI mode cell in wireless device operations based on the indication in the cross-carrier scheduling configuration of the association with both CORESET pools.

In some aspects, handling the schedule cell as a multi-DCI mode cell in wireless device operations may include counting the schedule cell as two serving cells to generate a type-2 HARQ-ACK codebook for the schedule cell.

In some aspects, handling the schedule cell as a multi-DCI mode cell in wireless device operations may include initializing two scrambling identifiers for physical downlink shared channels (PDSCHs) in the schedule cell.

In some aspects, handling the schedule cell as a multi-DCI mode cell in wireless device operations may include configuring two lists of cell-specific reference signal (CRS) rate matching patterns in the schedule cell.

In some aspects, handling the schedule cell as a multi-DCI mode cell in wireless device operations may include supporting out-of-order operations for the schedule cell.

In some aspects, handling the schedule cell as a multi-DCI mode cell in wireless device operations may include associating two lists of active transmission configuration indicator (TCI) states with the schedule cell.

In some aspects, handling the schedule cell as a multi-DCI mode cell in wireless device operations may include including the schedule cell in a list of serving cells provided with CORESETPoolIndex values of both zero and one for calculating physical downlink control channel (PDDCH) candidates and/or non-overlapped control channel element (CCE) limits.

In some aspects, the cross-carrier scheduling configuration may be received in a radio resource control (RRC) message.

In some aspects, the one or more CORESET pools may be indicated by one or more Control Resource Set (CORESET) Pool Index (CORESETPoolIndex) values.

Various aspects include methods performed by a processor of a network computing device for managing cross-carrier scheduling. Various aspects may include transmitting a cross-carrier scheduling configuration of a scheduled cell to a wireless device. In some aspects, the cross-carrier scheduling configuration may indicate one or more associated CORESET pools of a scheduling cell configured to schedule the scheduled cell. Some aspects may include transmitting DCI for the scheduled cell from the scheduling cell to the wireless device and receiving joint feedback from the wireless device for Type-1 HARQ-ACK operations for a communication associated with scheduled cell.

In some aspects, the associated one or more CORESET pools may be indicated by one or more CORESET Pool Index (CORESETPoolIndex) values.

In some aspects, the cross-carrier scheduling configuration may indicate a single of the one or more associated CORESET pools of the scheduling cell is the CORESET pool of the scheduled cell.

In some aspects, the cross-carrier scheduling configuration may indicate a two of the one or more associated CORESET pools of the scheduling cell are both CORESET pools of the scheduled cell.

In some aspects, the cross-carrier scheduling configuration may be transmitted to the wireless device in a radio resource control (RRC) message.

Further aspects include a wireless device having a processor configured with processor-executable instructions to perform operations of any of the methods summarized above. Further aspects include a processor configured for use in a wireless device and configured with processor-executable instructions to perform operations of any of the methods summarized above. Further aspects include a wireless device having means for performing functions of any of the methods summarized above. Further aspects include a non-transitory processor-readable storage medium having stored thereon processor-executable instructions configured to cause a wireless device processor to perform operations of any of the methods summarized above.

Further aspects may include a network computing device having a processor configured to perform one or more operations of any of the methods summarized above. Further aspects may include a non-transitory processor-readable storage medium having stored thereon processor-executable instructions configured to cause a processor of a network computing device to perform operations of any of the methods summarized above. Further aspects include a network computing device having means for performing functions of any of the methods summarized above. Further aspects include a system-on-chip for use in a network computing device that includes a processor configured to perform one or more operations of any of the methods summarized above. Further aspects include a system in a package that includes two systems on chip for use in a network computing device that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIGS. 5A and 5B illustrate two examples of cross-carrier scheduling.

FIG. 9B illustrates an example cross-carrier scheduling schema according to various embodiments.

FIG. 11 illustrates an example of cross-carrier scheduling supporting joint-semi-static HARQ-ACK according to various embodiments.

DETAILED DESCRIPTION

Figure 1:
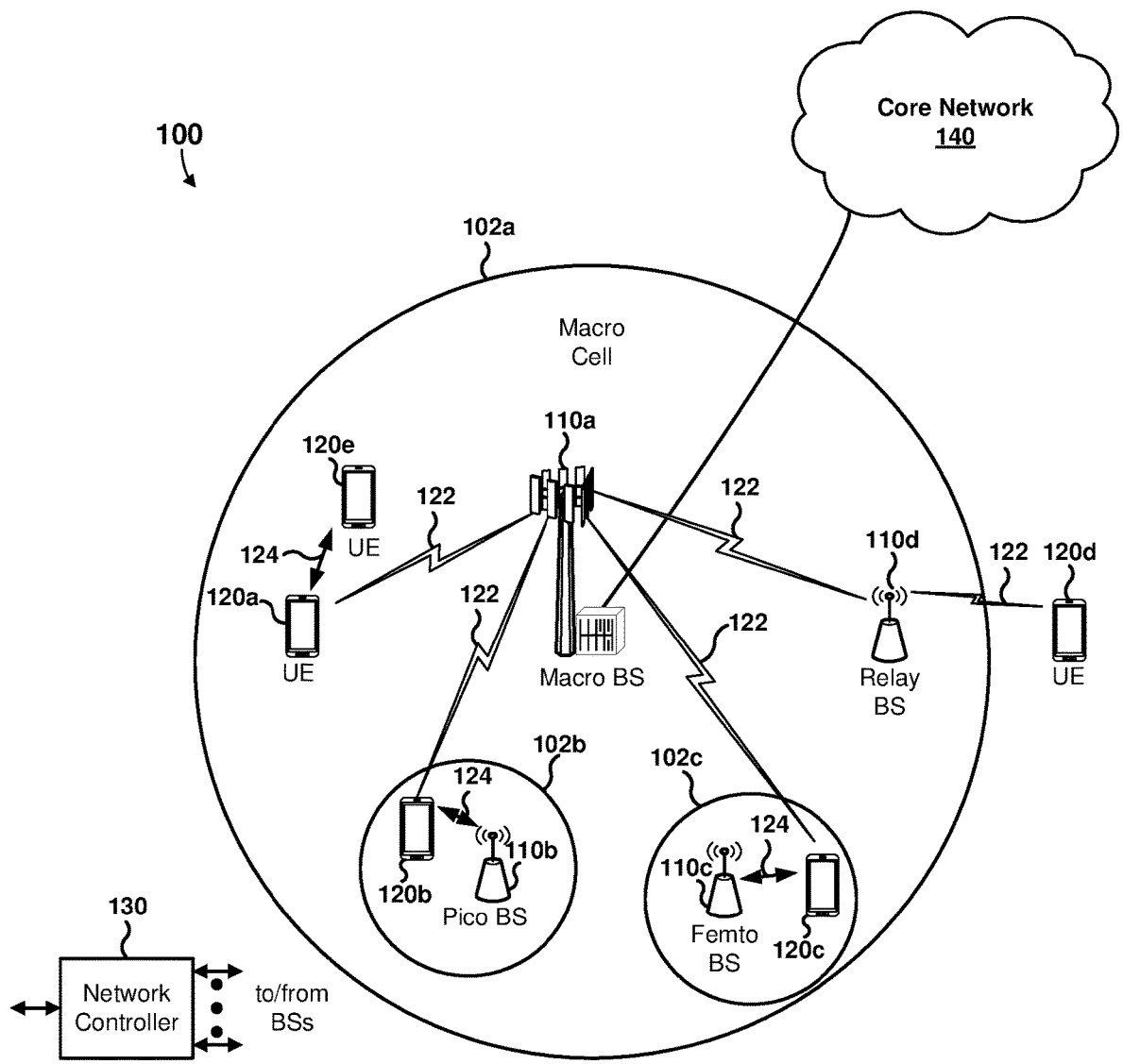
FIG. 1 is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for enabling cross-carrier scheduling in the presence of multi-downlink control information (DCI) (multi-DCI) based multi-transmit-receive point (MTRP). Various embodiments may enable a wireless device to manage cross-carrier scheduling. Various embodiments may enable wireless devices to determine Control Resource Set (CORESET) Pool Index (CORESETPoolIndex) values for cross-carrier scheduled serving cells (also sometimes referred to a component carriers (CCs)). Various embodiments may enable a wireless device to handle a serving cell (or CC) that is a scheduled cell cross-carrier scheduled by a scheduling cell as a multi-DCI mode cell in wireless device operations. In various embodiments, handle a serving cell (or CC) that is a scheduled cell cross-carrier scheduled by a scheduling cell as a multi-DCI mode cell in wireless device operations may support hybrid automatic repeat request (HARQ) acknowledgement (HARQ-ACK) operations for the serving cell, physical downlink shared channel (PDSCH) scrambling operations for the serving cell, cell-specific reference signal (CRS) rate matching operations for the serving cell, out-of-order operations for the serving cell, PDSCH active transmission configuration indicator (TCI) state operations for the serving cell, physical downlink control channel (PDDCH) candidate calculation operations for the serving cell, and/or non-overlapped control channel element (CCE) limit calculation operations for the serving cell. Various embodiments may enable a wireless device to manage cross-carrier scheduling with a scheduling cell and a scheduled cell. Cross-carrier scheduling may be useful to reduce signal interference in heterogeneous network deployments that employ carrier aggregation, especially where a heterogeneous combination of macro cells, small cells, relays, etc. is used. Cross-carrier scheduling also may be used to balance the loads from traffic and scheduling across different component carriers.

The term "wireless device" is used herein to refer to any one or all of cellular telephones, smartphones, portable computing devices, personal or mobile multimedia players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "radio resource" is used herein to refer to hardware, such as modems, radios, processors, transceivers, transmitters, receivers, timers, voltage regulators, oscillators, amplifiers, filters, antennas, circuits, encoders, decoders, etc., and/or software that operate individually, or in any combination, for sending and/or receiving electromagnetic radiation to provide wireless communication services, such as cellular and mobile communication services.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

In cross-carrier scheduling, a first cell (a "scheduling cell" such as a primary cell or "PCell") may provide scheduling information in a downlink control information (DCI) of a Physical Downlink Control Channel (PDCCH) for a second cell (a "scheduled cell" such as a secondary cell or "SCell"). The scheduling cell PDCCH provides DCI that schedules downlink and uplink data channels (i.e., the Physical Downlink Shared Channel (PDSCH) and Physical Uplink Shared Channel (PUSCH)) of the scheduled cell (for example, DCI format 1_1 for the scheduling of a PDSCH and DCI format 0_1 for the scheduling of a PUSCH). The scheduling cell PDCCH also includes a Carrier Indicator Field (CIF) that identifies component carriers on which resources are scheduled. The CIF in the DCI is used to indicate the scheduled serving cell (or CC). A number of bits for the CIF may be from 0 bits to 3 bits. When no bits for the CIF are configured (e.g., no CIF bits are present, or said another way the CIF has no presence), the lack of a CIF indicates only self-scheduling is possible. If a CIF value is set to 0, the cell performs self-scheduling and the scheduling DCI is for the same serving cell (or CC). If a CIF value is set to a non-zero value (e.g., an integer value of 1 to 7), the serving cell may be scheduling a scheduled cell. In some embodiments, configuration may be provided as "CrossCarrierSchedulingConfig" in RRC. Two different scheduling cells cannot schedule the same scheduled cell. In addition, a scheduled cell typically does not monitor a PDCCH when another cell schedules that cell with a corresponding CIF value.

A cell may be configured for multi-transmit-receive point (multi-TRP) (MTRP) operation. The term "transmit-receive point" (TRP) is used herein to refer to any 5G new radio (NR) entity capable of transmitting and receiving signals, and may include macrocells, small cells, picocells, femtocells, remote radio heads, relay nodes, panels, radio frequency (RF) modules in a cell, and other similar devices.

An MTRP operation may be defined for a given serving cell (for example, a given component carrier (CC)). A first DCI transmitted from a first TRP may schedule a first PDSCH that is transmitted from the first TRP. A second DCI transmitted from a second TRP may schedule a second PDSCH that is transmitted from the second TRP. In some embodiments, to enable a wireless device to monitor the first and second DCIs transmitted from the first and second TRPs, different Control Resource Sets (CORESETs) may be used. In some embodiments, a maximum permitted number of CORESETs may be 3 or more, such as for example, 3, 4, 5, etc. To enable the wireless device to differentiate TRPs based on a CORESET group, a higher layer signaling index, such as a Control Resource Set (CORESET) Pool Index (CORESETPoolIndex), may be defined per CORESET that may enable grouping of CORESETs into two groups. Each CORESET group may be indicated by a CORESETPoolIndex value (for example, CORESETPoolIndex=0 and CORESETPoolIndex=1). In some embodiments, any distinction between TRPs may be transparent to the wireless device. In some embodiments, a wireless device may be configured by a higher layer parameter PDDCH-Config that contains two different values of CORESETPoolIndex in CORESETs for the active bandwidth part (BWP) of a serving cell. For example, a CORESETPoolIndex=0 may be associated with a CORESET identifier (ID) of 1 and a CORESET ID of 2 and a CORESETPoolIndex=1 may be associated with a CORESET ID of 3 and a CORESET ID of 4. In various embodiments, multi-DCI based MTRP may be defined in a given serving cell (or CC) and only some serving cells (or CCs) may be configured with two values of CORESETPoolIndex.

To implement multi-DCI based MTRP communications, a determination may be made as to whether a scheduling cell can schedule a serving cell (a scheduled cell). In some cases, the scheduling cell may not be configured to perform multi-DCI based MTRP communications. In some embodiments, a determination may be made as to whether the serving cell may schedule a particular scheduled cell. In some cases, the scheduled cell may not be configured to perform multi-DCI based MTRP communications. Further, determinations may be needed regarding how to perform various communication operations that depend on a CORESETPoolIndex in which a DCI is received, such as HARQ-Ack feedback, PDSCH scrambling, rate matching for PDSCH, and the like.

In current networks, multi-DCI based MTRP may only be supported when a serving cell is self-scheduling. In current networks, no CORESET may be configured for a cross-carrier scheduled cell. The failure of current networks to configure a CORESET for cross-carrier schedule cells can prevent multi-DCI based MTRP being implemented for a cross-carrier scheduled cell in current networks. The failure of current networks to configure a CORESET for cross-carrier schedule cells can prevent joint Type-1 (i.e. semi-static) hybrid automatic repeat request (HARQ) acknowledgement (HARQ-ACK) from being implemented for a cross-carrier scheduled cell in current networks.

In Type-1 (i.e., semi-static) HARQ-ACK, for each CC, a set of occasions for candidate PDSCH reception are determined. For each CC, if a PDSCH is received in an occasion for candidate PDSCH reception, HARQ-ACK for the PDSCH is inserted in the corresponding place. Otherwise, non-acknowledgement (NACK) is inserted. This is done across all configured downlink (DL) CCs. For multi-DCI and when joint feedback is configured, Type-1 (i.e., semi-static) HARQ-ACK includes defining two lists of CCs associated with the two values of CORESETPoolIndex. A CC that is configured with multi-DCI appears one time in a first list (referred to as list or set "S0") and another time in a second list (referred to as list or set "S1"). Then, the procedures for HARQ-ACK generation are done two times, once for the first set S0 and another time for the second set S1. The joint feedback is transmitted in the same physical uplink control channel (PUCCH) resource after concatenating the two codebooks (i.e., the two Type-1 HARQ-ACK codebooks) generated from the two lists (i.e., S0 and S1). As no CORESET may be configured for a cross-carrier scheduled cell in current networks, the lack of a configured CORESET prevents the proper association of the cross-carrier scheduled cell with the sets (i.e., S0 and S1) for Type-1 HARQ-ACK in current networks.

Various embodiments include systems and method for enabling cross-carrier scheduling in the presence of multi-DCI based MTRP. Various embodiments may enable CORESETPoolIndex values of scheduling cells to be associated with the scheduled cells cross-carrier scheduled by the scheduling cells. Various embodiments may enable joint Type-1 (i.e. semi-static) HARQ-ACK for cross-carrier scheduled cells.

In various embodiments, a wireless device may determine whether CORESETs in a first CC (or serving cell) are configured with a CORESETPoolIndex value and the first CC (or serving cell) schedules a second CC (or serving cell) (i.e., the first CC is a scheduling cell and the second CC is a scheduled cell). In response to determining that CORESETs in a first CC (or serving cell) are configured with a CORESETPoolIndex value, and the first CC (or serving cell) is scheduling a second CC (or serving cell) (i.e., the first CC is a scheduling cell and the second CC is a scheduled cell), the second CC (or serving cell) may be associated with the same value of CORESETPoolIndex as the first CC (or serving cell) by the wireless device.

In various embodiments, a wireless device may determine whether at least one CC (or serving cell) is configured with two values of CORESETPoolIndex and joint feedback and Type-1 HARQ-ACK is set for the wireless device. For example, the wireless device may determine whether joint Type-1 HARQ-ACK is set for the wireless device by determining whether joint feedback and Type-1 HARQ-ACK codebook are RRC configured on the wireless device. In response to determining that at least one CC (or serving cell) is configured with two values of CORESETPoolIndex and joint feedback and Type-1 HARQ-ACK is set for the wireless device, the wireless device may place (or assign) a CC (or serving cell) that is cross-carrier scheduled by another CC (or serving cell) (a scheduling CC or scheduling cell) in the first list (S0) in response to in the scheduling CC (or scheduling cell) only CORESETPoolIndex=0 being configured or CORESETPoolIndex not being configured (e.g., not being present in the CIF). In response to determining that at least one CC (or serving cell) is configured with two values of CORESETPoolIndex and joint feedback and Type-1 HARQ-ACK is set for the wireless device, the wireless device may place (or assign) a CC (or serving cell) that is cross-carrier scheduled by another CC (or serving cell) (a scheduling CC or scheduling cell) in the second list (S1) in response to in the scheduling CC (or scheduling cell) only CORESETPoolIndex=1 being configured. The procedures for HARQ-ACK generation may then be performed two times; once for the set S0 and another time for the set S1, and the joint feedback is transmitted in the same PUCCH resource after concatenating the two codebooks generated from the two lists (i.e., S0's codebook concatenated with S1's codebook).

In various embodiments, a network computing device may generate a cross-carrier scheduling configuration for a scheduled cell (or schedule CC) indicating an associated CORESETPoolIndex value of a scheduling cell (or scheduling CC) configured to schedule the scheduled cell (or scheduled CC). The cross-carrier scheduling configuration may be sent to wireless devices served by the scheduling cell (or scheduling CC). For example, the cross-carrier scheduling configuration may be sent to a wireless device in a RRC message, such as a part of a "CrossCarrierSchedulingConfig" in RRC. In various embodiments, the associated CORESETPoolIndex value may correspond to a CORESETPoolIndex value of the scheduling cell (or scheduling CC). In some embodiments, the associated CORESETPoolIndex value may be zero or one. In some embodiments, the associated CORESETPoolIndex value may indicate the scheduling cell (or scheduling CC) has both a CORESETPoolIndex value of zero and a CORESETPoolIndex value of one. In this manner, the associated CORESETPoolIndex value may indicate the scheduling cell (or scheduling CC) is a multi-DCI mode cell, such as a multi-DCI based mode cell supporting MTRP. In various embodiments, the associated CORESETPoolIndex value may be two.

In various embodiments, a scheduling CC (or scheduling cell) that is configured with two values of CORESETPoolIndex in different CORESETs may schedule a second CC (or second serving cell) (i.e., a scheduled CC or scheduled cell) and the second CC (or second serving cell) (i.e., a scheduled CC or scheduled cell) may always associated with CORESETPoolIndex=0. In such embodiments, only CORESETs with CORESETPoolIndex=0 in the scheduling CC (or scheduling cell) may schedule the second CC (or second serving cell) (i.e., a scheduled CC or scheduled cell).

In various embodiments, a scheduling CC (or scheduling cell) that is configured with two values of CORESETPoolIndex in different CORESETs may schedule a second CC (or second serving cell) (i.e., a scheduled CC or scheduled cell) and the second CC (or second serving cell) (i.e., a scheduled CC or scheduled cell) may be associated with one CORESETPoolIndex value. In such embodiments, the CORESETPoolIndex value may be configured as part of cross-carrier scheduling configuration through RRC. In such embodiments, only CORESETs with that CORESETPoolIndex value in the scheduling CC (or scheduling cell) may schedule the second CC (or second serving cell) (i.e., a scheduled CC or scheduled cell).

In various embodiments, a scheduling CC (or scheduling cell) that is configured with two values of CORESETPoolIndex in different CORESETs may schedule a second CC (or second serving cell) (i.e., a scheduled CC or scheduled cell) and the second CC (or second serving cell) (i.e., a scheduled CC or scheduled cell) may be associated with CORESETPoolIndex value 0, value 1, or both 0 and 1. The CORESETPoolIndex values may be configured as part of cross-carrier scheduling configuration through RRC. Both values of CORESETPoolIndex being configured (i.e., both 0 and 1 being configured) may indicate the second CC (or second serving cell) (i.e., a scheduled CC or scheduled cell) is operating in the multi-DCI mode. In some embodiments, a third integer value for an associated CORESETPoolIndex, such as a value of two, may indicate both values of CORESETPoolIndex are configured (i.e., both 0 and 1 are configured) for the second CC (or second serving cell) (i.e., a scheduled CC or scheduled cell).

In various embodiments, a wireless device may determine whether a scheduling CC (or scheduling cell) is configured with two values of CORESETPoolIndex in different CORESETs, and the scheduling CC (or scheduling cell) schedules a second CC (or second serving cell) (i.e., a scheduled CC or scheduled cell) while joint feedback and Type-1 HARQ-ACK is set for the wireless device. For example, the wireless device may determine whether joint Type-1 HARQ-ACK is set for the wireless device by determining whether joint feedback and Type-1 HARQ-ACK codebook are RRC configured on the wireless device. In response to determining that a scheduling CC (or scheduling cell) is configured with two values of CORESETPoolIndex in different CORESETs, and the scheduling CC (or scheduling cell) schedules a second CC (or second serving cell) (i.e., a scheduled CC or scheduled cell) while joint feedback and Type-1 HARQ-ACK is set for the wireless device, the wireless device may place (or assign) the second CC (or second serving cell) (i.e., a scheduled CC or scheduled cell) in the first list (S0) in response to the second CC (or second serving cell) (i.e., a scheduled CC or scheduled cell) being associated with CORESETPoolIndex=0 (e.g., scheduled by CORESETs with CORESETPoolIndex=0 in the scheduling cell).

In response to determining that a scheduling CC (or scheduling cell) is configured with two values of CORESETPoolIndex in different CORESETs, and the scheduling CC (or scheduling cell) schedules a second CC (or second serving cell) (i.e., a scheduled CC or scheduled cell) while joint feedback and Type-1 HARQ-ACK is set for the wireless device, the wireless device may place (or assign) the second CC (or second serving cell) (i.e., a scheduled CC or scheduled cell) in the second list (S1) in response to the second CC (or second serving cell) (i.e., a scheduled CC or scheduled cell) being associated with CORESETPoolIndex=1 (e.g., scheduled by CORESETs with CORESETPoolIndex=1 in the scheduling cell)

In response to determining that a scheduling CC (or scheduling cell) is configured with two values of CORESETPoolIndex in different CORESETs, and the scheduling CC (or scheduling cell) schedules a second CC (or second serving cell) (i.e., a scheduled CC or scheduled cell) while joint feedback and Type-1 HARQ-ACK is set for the wireless device, the wireless device may place (or assign) the second CC (or second serving cell) (i.e., a scheduled CC or scheduled cell) in both the first list (S0) and the second list (S1) in response to the second CC (or second serving cell) (i.e., a scheduled CC or scheduled cell) being associated with both values of CORESETPoolIndex (e.g., the second CC (or second serving cell) (i.e., a scheduled CC or scheduled cell) can be scheduled by CORESETs with CORESETPoolIndex=0 and CORESETPoolIndex=1 in the scheduling cell).

In various embodiments, in response to assigning the schedule cell (or schedule CC) to one or both of the lists (e.g., S0 and/or S1), the procedures for HARQ-ACK generation may then be performed two times; once for the set S0 and another time for the set S1, and the joint feedback is transmitted in the same PUCCH resource after concatenating the two codebooks generated from the two lists (i.e., S0's codebook concatenated with S1's codebook).

Various embodiments may include determining whether a serving cell is cross-carrier scheduled by a scheduling cell (e.g., determining whether a serving cell is a scheduled cell (or scheduled CC) or not a scheduled cell (or not a scheduled CC)). Various embodiments may include determining whether a scheduling cell (or scheduling CC) is associated with both CORESETPoolIndex values (e.g., is associated with CORESETPoolIndex value=0 and CORESETPoolIndex value=1) based on a cross-carrier scheduling configuration of a scheduled cell (or scheduled CC) in response to determining that the serving cell is cross-carrier scheduled by a scheduling cell (e.g., determining that a serving cell is a scheduled cell (or scheduled CC)). In various embodiments, a scheduled CC (or scheduled cell) that is being cross-carrier scheduled by a scheduling CC (or scheduling cell) being associated with both CORESETPoolIndex values (e.g., 0 and 1) may indicate the scheduled CC (or scheduled cell) is also a MTRP CC (or MTRP cell) in addition to the scheduling CC (or scheduling cell) being a MTRP CC (or MTRP cell). In various embodiments, a scheduled CC (or scheduled cell) that is being cross-carrier scheduled by a scheduling CC (or scheduling cell) being associated with both CORESETPoolIndex values (e.g., 0 and 1) may indicate to a wireless device to handle the scheduled CC (or scheduled cell) as a serving cell that is a multi-DCI mode cell in wireless device operations.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include one or more of performing HARQ-ACK operations for the serving cell (e.g., the scheduled CC (or scheduled cell)), performing physical downlink shared channel (PDSCH) scrambling operations for the serving cell (e.g., the scheduled CC (or scheduled cell)), performing cell-specific reference signal (CRS) rate matching operations for the serving cell (e.g., the scheduled CC (or scheduled cell)), performing out-of-order operations for the serving cell (e.g., the scheduled CC (or scheduled cell)), performing PDSCH active transmission configuration indicator (TCI) state operations for the serving cell (e.g., the scheduled CC (or scheduled cell)), performing physical downlink control channel (PDDCH) candidate calculation operations for the serving cell (e.g., the scheduled CC (or scheduled cell)), performing non-overlapped control channel element (CCE) limit calculation operations for the serving cell (e.g., the scheduled CC (or scheduled cell)), etc.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include adding the serving cell to two HARQ-ACK codebooks. In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include counting the serving cell as two serving cells to generate a type-2 HARQ-ACK codebook for the serving cell In various embodiments, for joint HARQ-ACK for dynamic codebooks the serving cell (e.g., the scheduled CC (or scheduled cell) that is being cross-carrier scheduled by a scheduling CC (or scheduling cell) being associated with both CORESETPoolIndex values (e.g., 0 and 1)) may be counted two times for creating the HARQ-ACK codebook, once corresponding to CORESETPoolIndex=0 and another time corresponding to CORESETPoolIndex=1. In such embodiments, counter downlink assignment index (DAI) and total DAI corresponding to the serving cell (e.g., the scheduled CC (or scheduled cell) may be first considered for CORESETPoolIndex=0, and second for CORESETPoolIndex=1.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include initializing two scrambling identifiers for a PDSCHs in the serving cell. In various embodiments, for PDSCH scrambling two scrambling initialization identifiers (IDs) may be configured for PDSCH in the serving cell (e.g., the scheduled CC (or scheduled cell) that is being cross-carrier scheduled by a scheduling CC (or scheduling cell) being associated with both CORESETPoolIndex values (e.g., 0 and 1)). In such embodiments, PDSCHs associated with CORESETPoolIndex=0 may use the first ID and PDSCHs associated with CORESETPoolIndex=1 use the second ID.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include configuring two lists of cell-specific reference signal (CRS) rate matching patterns in the serving cell. In various embodiments, for CRS rate matching two lists of CRS patterns may be configured in the serving cell (e.g., the scheduled CC (or scheduled cell) that is being cross-carrier scheduled by a scheduling CC (or scheduling cell) being associated with both CORESETPoolIndex values (e.g., 0 and 1)). In such embodiments, PDSCHs associated with CORESETPoolIndex=0 may use the list for rate matching and PDSCHs associated with CORESETPoolIndex=1 may use the second list for rate matching.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include supporting out-of-order operations for the serving cell. In various embodiments, out-of-order operation may be allowed in the serving cell (e.g., the scheduled CC (or scheduled cell) that is being cross-carrier scheduled by a scheduling CC (or scheduling cell) being associated with both CORESETPoolIndex values (e.g., 0 and 1)) such that PDCCH-to-PDSCH, PDSCH-to-HARQ-ACK, and/or PDCCH-to-PUSCH may be supported.

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include associating two lists of active transmission configuration indicator (TCI) states with the serving cell. In various embodiments, for PDSCH active TCI states, two lists of active TCI states may be received by two separate media access control (MAC)-control elements (CEs) (MAC-CEs) for the serving cell (e.g., the scheduled CC (or scheduled cell) that is being cross-carrier scheduled by a scheduling CC (or scheduling cell) being associated with both CORESETPoolIndex values (e.g., 0 and 1)) and the two lists may be associated with the two values of CORESETPoolIndex (e.g., 0 and 1).

In various embodiments, handling the serving cell (e.g., the scheduled CC (or scheduled cell) that is being cross-carrier scheduled by a scheduling CC (or scheduling cell) being associated with both CORESETPoolIndex values (e.g., 0 and 1)) as a multi-DCI mode cell in wireless device operations may include including the serving cell in a list of serving cells provided with CORESETPoolIndex values of both zero and one for calculating physical downlink control channel (PDDCH) candidates and/or non-overlapped control channel element (CCE) limits. In various embodiments, there may be limits on number of PDCCH candidates and/or the number of non-overlapped CCEs. In various embodiments, the serving cell (e.g., the scheduled CC (or scheduled cell) that is being cross-carrier scheduled by a scheduling CC (or scheduling cell) being associated with both CORESETPoolIndex values (e.g., 0 and 1)) may be counted as part of a list or set of serving cells provided with CORESETPoolIndex values of both zero and one (e.g., a second set of DL CCs ($N_{cells,1}^{DL}$)) for calculating PDCCH blind decode and/or non-overlapped CCE limits.

FIG. 1 illustrates an example of a communications system 100 that is suitable for implementing various embodiments. The communications system 100 may be a 5G NR network, or any other suitable network such as an LTE network. While FIG. 1 illustrates a 5G NR network, later generation networks may include the same or similar elements. Therefore, the reference to a 5G NR network and 5G NR network elements in the following descriptions is for illustrative purposes and is not intended to be limiting.

The communications system 100 may include a heterogeneous network architecture that includes a core network 140, supporting one or more wireless networks 102a, and a variety of mobile devices (illustrated as wireless devices 120a-120e). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The communications system 100 also may include relay stations (e.g., relay BS 110d). A relay station is an entity that can receive a transmission of data from an upstream station (for example, a base station or a mobile device) and send a transmission of the data to a downstream station (for example, a wireless device or a base station). A relay station also may be a wireless device that can relay transmissions for other mobile devices. In the example illustrated in FIG. 1, a relay station 110d may communicate with the macro base station 110a and the wireless device 120d in order to facilitate communication between the macro base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts), whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a mobile device, a subscriber unit, a station, user equipment (UE), etc.

A macro base station 110a may communicate with the core network 140 over a wired or wireless communication link. The wireless devices 120a, 120b, 120c may communicate with a base station 110a-110d over a wireless communication links 122.

Wired communication links may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

Wireless communication links may include a plurality of carrier signals, frequencies, or frequency bands, each of which may include a plurality of logical channels. The wireless communication links may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communications system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may depend on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, some embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DUUL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to two streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. Wireless devices 120a-120e may be included inside a housing that houses components of the devices, such as processor components, memory components, similar components, or a combination thereof.

In general, any number of communications systems and any number of wireless networks may be deployed in a given geographic area. Each communications system and wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. The scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. In some examples, a wireless device may function as a scheduling entity, scheduling resources for one or more subordinate entities (for example, one or more other mobile devices). In this example, the wireless device is functioning as a scheduling entity, and other mobile devices utilize resources scheduled by the wireless device for wireless communication. A wireless device may function as a scheduling entity in a peer-to-peer (P2P) network, in a mesh network, or another type of network. In a mesh network example, mobile devices may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some embodiments, two or more mobile devices (for example, illustrated as the wireless device 120a and the wireless device 120e) may communicate directly using one or more sidelink channels (for example, without using a base station 110a as an intermediary to communicate with one another). For example, the wireless devices 120a, 120e may communicate using peer-to-peer (P2P) communications 124, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a may perform scheduling operations, resource selection operations, as well as other operations described elsewhere herein as being performed by the base station 110d.

Some embodiments may be implemented on a number of single processor and multiprocessor computer systems, including a system-on-chip (SOC) or system in a package (SIP).

Figure 2:
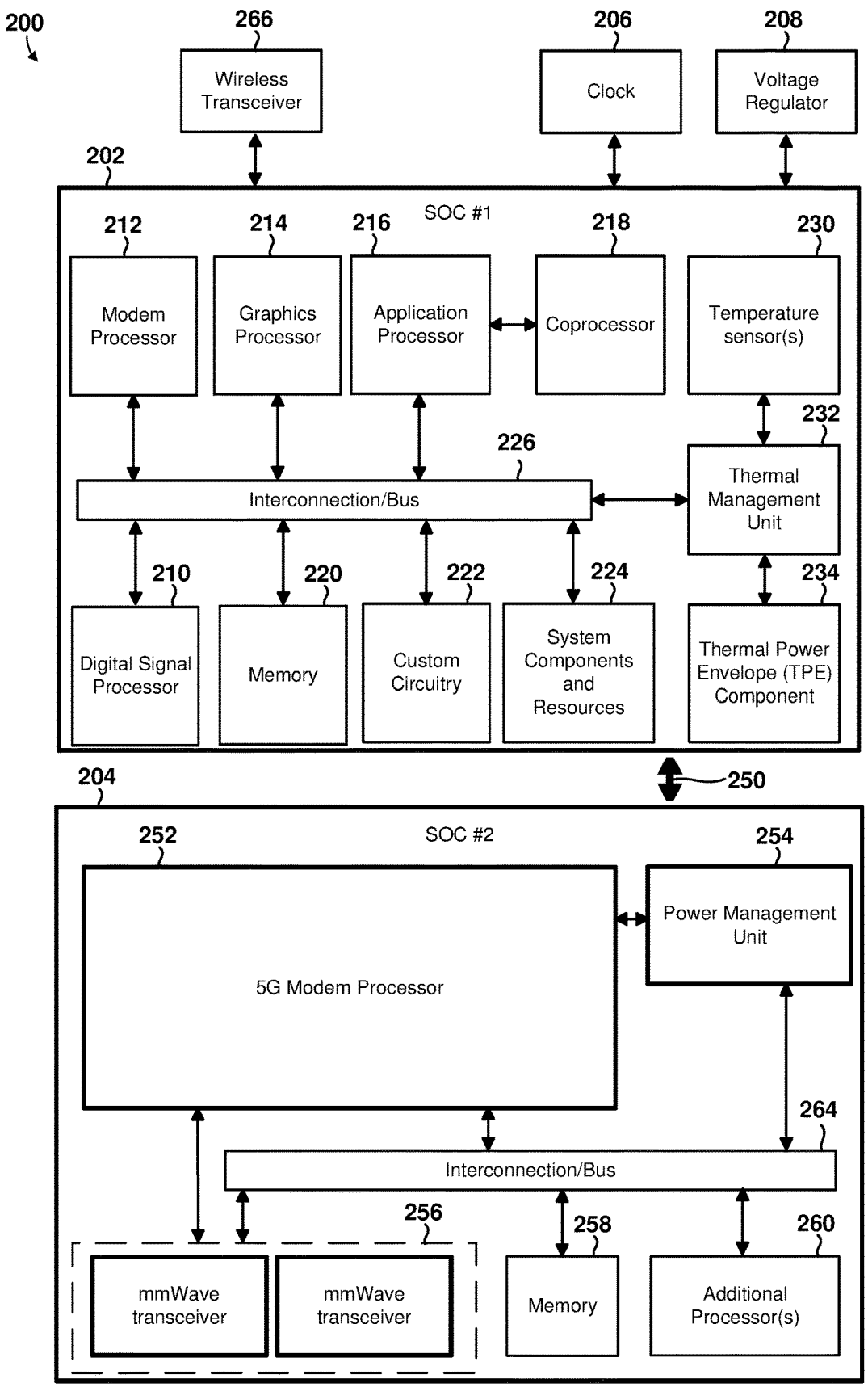
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example wireless device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from network wireless devices, such as a base station 110a. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), or very high frequency short wavelength (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (e.g., CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, some embodiments may be implemented in a wide variety of computing systems, which may include a single processor, multiple processors, multicore processors, or any combination thereof.

Figure 3:
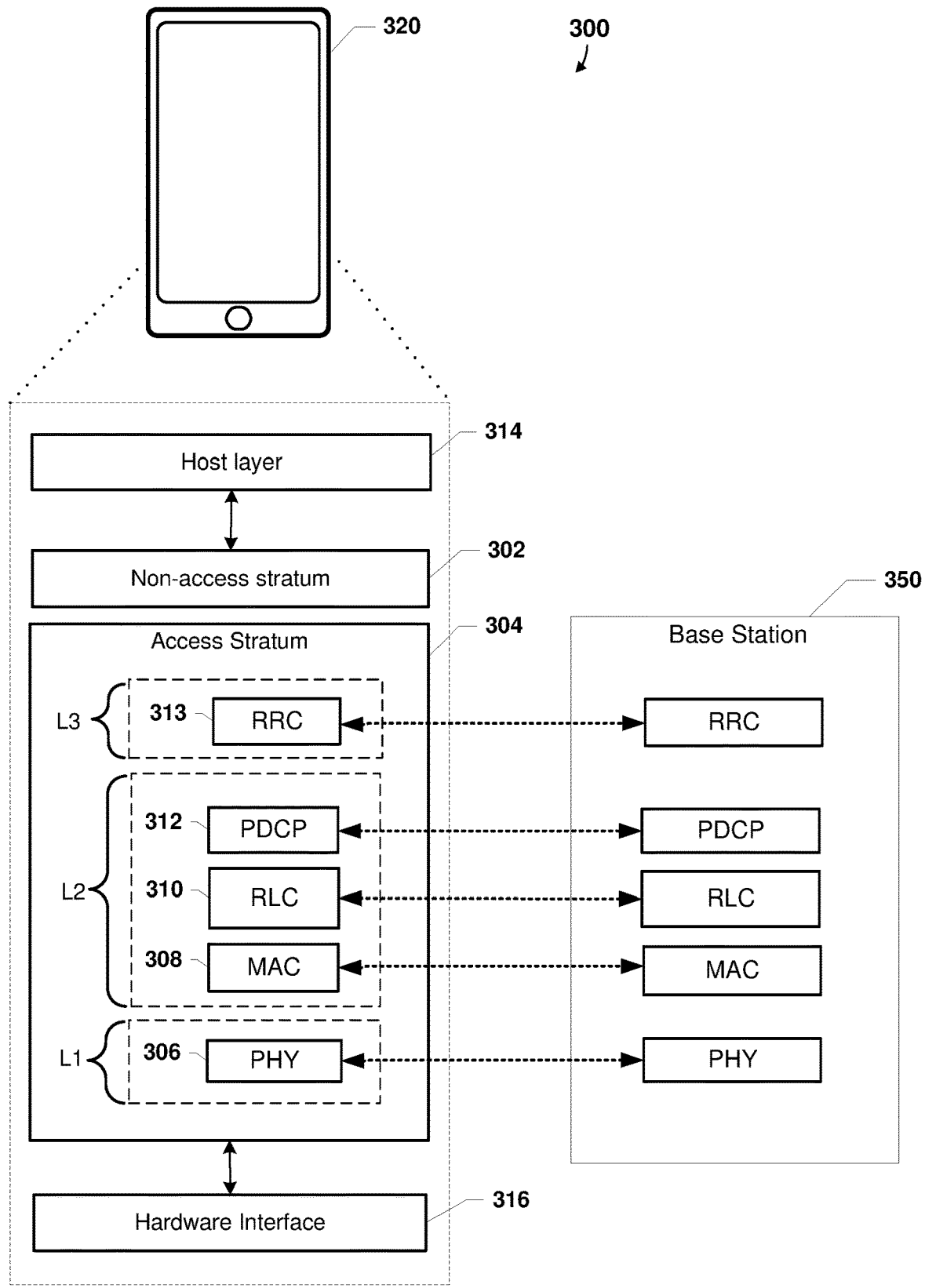
FIG. 3 is a component block diagram illustrating a software architecture including a radio protocol stack for the user and control planes in wireless communications suitable for implementing any of the various embodiments.

FIG. 3 illustrates an example of a software architecture 300 including a radio protocol stack for the user and control planes in wireless communications between a base station 350 (e.g., base station 110a-110d) and a wireless device 320 (e.g., any of the wireless devices 120a-120e). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the PDCCH and the PDSCH.

In the user and control planes, Layer 2 (L2) of the AS 304 may be responsible for the link between the wireless device 320 and the base station 350 over the physical layer 306. In some embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some embodiments, the RRC sublayer 313 may provide functions including broadcasting system information, paging, and establishing and releasing an RRC signaling connection between the wireless device 320 and the base station 350.

In some embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and a general purpose processor, such as application processor 216, etc.

In some other embodiments, the software architecture 300 may include one or more higher logical layer (e.g., transport, session, presentation, application, etc.) that provide host layer functions. For example, in some embodiments, the software architecture 300 may include a network layer (e.g., Internet Protocol (IP) layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more RF transceivers).

Figure 4:
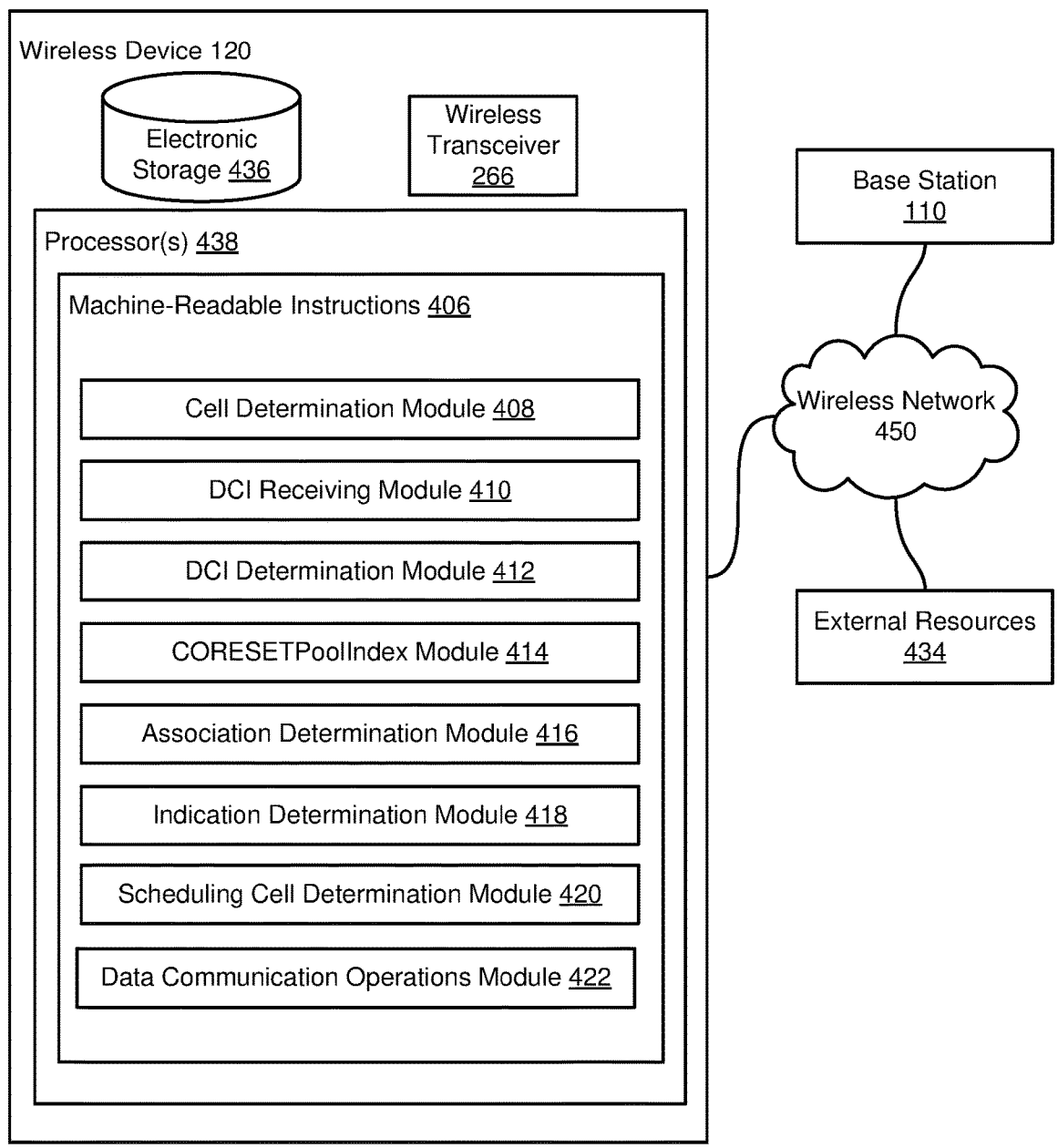
FIG. 4 is a component block diagram of an example system configured for managing cross-carrier scheduling by a processor of a wireless device.

FIG. 4 is a component block diagram illustrating a communication system 400 configured for wireless communication in accordance with various embodiments. With reference to FIGS. 1-4, the communication system 400 may include wireless devices 120 (e.g., wireless device 120a-e, 200, 320), and one or more base stations 110 (e.g., base station 110a-e, 350) forming a wireless communications network 450 (e.g., communications system 100), which may provide connections to external resources 434. External resources 434 may include sources of information outside of system 400, external entities participating with the system 400, and/or other resources.

Wireless devices 120 may include a wireless transceiver 266 and a processor 438 configured by machine-readable instructions 406 stored in electronic storage 436. Machine-readable instructions 406 may include one or more instruction modules. The instruction modules may include computer program modules. The instruction modules may include one or more of a cell determination module 408, a DCI receiving module 410, a DCI determination module 412, CORESETPoolIndex module 414, an association determination module 416, an indication determination module 418, a scheduling cell determination module 420, a data communication operations module 422, and/or other instruction modules.

The cell determination module 408 may be configured to determine whether a scheduling cell or a scheduled cell is configured to perform multi-DCI based MTRP communication. The cell determination module 408 may be configured to determine whether a scheduling cell is configured to perform cross-carrier scheduling for a scheduled cell. The cell determination module 408 may be configured to determine whether a scheduling cell is configured to perform cross-carrier scheduling for a scheduled cell based on RRC configurations and/or DCI of the scheduling cell. The cell determination module 408 may be configured to determine whether at least one serving cell is configured with two Control Resource Set (CORESET) Pool Index (CORESETPoolIndex) values and joint Type-1 hybrid automatic repeat request (HARQ) acknowledgement (HARQ-ACK) is set for the wireless device. The cell determination module 408 may be configured to determine whether a serving cell is cross-carrier scheduled by a scheduling cell.

The DCI receiving module 410 may be configured to receive downlink control information from a scheduling cell. For example, the DCI may be received in or extracted from a PDCCH.

The DCI determination module 412 may be configured to determining a Control Resource Set (CORESET) Pool Index (CORESETPoolIndex) value of the scheduling cell. The DCI determination module 412 may be configured to determining a Control Resource Set (CORESET) Pool Index (CORESETPoolIndex) value of the scheduling cell based on the RRC configuration and/or the DCI of the scheduling cell. The DCI determination module 412 may be configured to determine the CORESETPoolIndex value of the scheduling cell as zero in response to the CORESETPoolIndex value of the scheduling cell being indicated as zero in the RRC configuration and/or DCI of the scheduling cell or no CORESETPoolIndex value being configured in the RRC configuration and/or DCI of the scheduling cell. The DCI determination module 412 may be configured to determine the CORESETPoolIndex value of the scheduling cell as one in response to the CORESETPoolIndex value of the scheduling cell being indicated as one in the RRC configuration and/or DCI of the scheduling cell. The DCI determination module 412 may be configured to determine the CORESETPoolIndex value of the scheduling cell as zero in response to the CORESETPoolIndex value configured for CORESETs in the scheduling cell being indicated as zero or no CORESETPoolIndex value being configured for the CORESETs in the scheduling cell. The DCI determination module 412 may be configured to determine the CORESETPoolIndex value of the scheduling cell as one in response to the CORESETPoolIndex value configured for the CORESETs in the scheduling cell being indicated as one.

The CORESETPoolIndex module 414 may be configured to associate the scheduled cell with the determined CORESETPoolIndex value of the scheduling cell. The CORESETPoolIndex module 414 may be configured to assign the serving cell that is cross-carrier scheduled by the scheduling cell to a set of serving cells for generating a Type-1 HARQ-ACK codebook based on the determined CORESETPoolIndex value of the scheduling cell. The CORESETPoolIndex module 414 may be configured to assign the serving cell that is cross-carrier scheduled by the scheduling cell to a first set of serving cells for generating a first Type-1 HARQ-ACK codebook based on the determined CORESETPoolIndex value of the scheduling cell being zero. The CORESETPoolIndex module 414 may be configured to assign the serving cell that is cross-carrier scheduled by the scheduling cell to a second set of serving cells for generating a second Type-1 HARQ-ACK codebook based on the determined CORESETPoolIndex value of the scheduling cell being one. The CORESETPoolIndex module 414 may be configured to assign the serving cell a CORESETPoolIndex value of zero in response to determining that the serving cell is cross-carrier scheduled by the scheduling cell. The CORESETPoolIndex module 414 may be configured to assign the serving cell the determined CORESETPoolIndex value of the scheduling cell. In various embodiments, the determined CORESETPoolIndex value of the scheduling cell may be a value of zero or a value of one. The CORESETPoolIndex module 414 may be configured to assign the serving cell a CORESETPoolIndex value of zero in response to determining the associated CORESETPoolIndex value is zero. The CORESETPoolIndex module 414 may be configured to assign the serving cell a CORESETPoolIndex value of one in response to determining the associated CORESETPoolIndex value is one. The CORESETPoolIndex module 414 may be configured to assign the serving cell both a CORESETPoolIndex value of zero and a CORESETPoolIndex value of one in response to determining the associated CORESETPoolIndex value is two. The CORESETPoolIndex module 414 may be configured to assign the serving cell that is cross-carrier scheduled by the scheduling cell to a first set of serving cells for generating a Type-1 HARQ-ACK codebook, wherein the first set of serving cells are serving cells associated with a CORESETPoolIndex value of zero in response to determining that at least one serving cell is configured with two CORESETPoolIndex values and joint Type-1 HARQ-ACK is set for the wireless device. The CORESETPoolIndex module 414 may be configured to assign the serving cell that is cross-carrier scheduled by the scheduling cell to one or more sets of serving cells for generating one or more Type-1 HARQ-ACK codebooks based on the determined one or more CORESETPoolIndex values for the scheduling cell in response to determining that at least one serving cell is configured with two CORESET-PoolIndex values and joint Type-1 HARQ-ACK is set for the wireless device. The CORESETPoolIndex module 414 may be configured to assign the serving cell that is cross-carrier scheduled by the scheduling cell to a first set of serving cells for generating a first Type-1 HARQ-ACK codebook based on the determined single CORESETPoolIndex value being zero. The CORESETPoolIndex module 414 may be configured to assign the serving cell that is cross-carrier scheduled by the scheduling cell to a second set of serving cells for generating a second Type-1 HARQ-ACK codebook based on the determined single CORESETPoolIndex value being one. The CORESETPoolIndex module 414 may be configured to assign the serving cell that is cross-carrier scheduled by the scheduling cell to a first set of serving cells for generating a first Type-1 HARQ-ACK codebook based on the determined associated CORESETPoolIndex value being zero. The CORESETPoolIndex module 414 may be configured to assign the serving cell that is cross-carrier scheduled by the scheduling cell to a second set of serving cells for generating a second Type-1 HARQ-ACK codebook based on the determined associated CORESETPoolIndex value being one. The CORESETPoolIndex module 414 may be configured to assign the serving cell that is cross-carrier scheduled by the scheduling cell to both the first set of serving cells for generating the first Type-1 HARQ-ACK codebook and the second set of serving cells for generating the second Type-1 HARQ-ACK codebook based on the determined associated CORESETPoolIndex value being two.

The association determination module 416 may be configured to determine the association of the DCI and the index based on a field in a payload of the DCI. The association determination module 416 may be configured to determine one or more Control Resource Set (CORESET) Pool Index (CORESETPoolIndex) values for the scheduling cell based on a cross-carrier scheduling configuration of the serving cell in response to determining that the serving cell is cross-carrier scheduled by the scheduling cell. The association determination module 416 may be configured to determine a CORESETPoolIndex value of the scheduling cell indicated in the cross-carrier scheduling configuration. The association determination module 416 may be configured to determine an associated CORESETPoolIndex value of the scheduling cell indicated in the cross-carrier scheduling configuration. The association determination module 416 may be configured to determine one or more CORESET-PoolIndex values for the scheduling cell based on a cross-carrier scheduling configuration of the serving cell that is cross-carrier scheduled by the scheduling cell in response to determining that at least one serving cell is configured with two CORESETPoolIndex values and joint Type-1 HARQ-ACK is set for the wireless device.

The indication determination module 418 may be configured to determine whether the scheduling cell has an associated CORESETPoolIndex value of zero, one, or two in the cross-carrier scheduling configuration of the serving cell.

The scheduling cell determination module 420 may be configured to determine whether the scheduling cell is configured with two or more CORESET groups. The scheduling cell determination module 420 may be configured to determine whether the scheduling cell is configured to perform multi-DCI based MTRP operations. In some embodiments, the associated CORESETPoolIndex value may correspond to a CORESETPoolIndex value of the scheduling cell. In some embodiments, the associated CORESETPoolIndex value may be zero or one. In some embodiments, the associated CORESETPoolIndex value may indicate the scheduling cell has both a CORESET-PoolIndex value of zero and a CORESETPoolIndex value of one. In some embodiments, the associated CORESET-PoolIndex value may be two.

The data communication operations module 422 may be configured to perform data communication operations according to the CORESETPoolIndex and/or associated CORESETPoolIndex. The data communication operations module 422 may be configured to handle the serving cell as a multi-DCI mode cell in wireless device operations in response to determining that the scheduling cell is associated with both CORESETPoolIndex values based on the cross-carrier scheduling configuration of the serving cell. The data communication operations module 422 may be configured to handle the serving cell as a multi-DCI mode cell in wireless device operations by adding the serving cell to two HARQ-ACK codebooks. The data communication operations module 422 may be configured to handle the serving cell as a multi-DCI mode cell in wireless device operations by initializing two scrambling identifiers for a physical downlink shared channels (PDSCHs) in the serving cell. The data communication operations module 422 may be configured to handle the serving cell as a multi-DCI mode cell in wireless device operations by configuring two lists of cell-specific reference signal (CRS) rate matching patterns in the serving cell. The data communication operations module 422 may be configured to handle the serving cell as a multi-DCI mode cell in wireless device operations by supporting out-of-order operations for the serving cell. The data communication operations module 422 may be configured to handle the serving cell as a multi-DCI mode cell in wireless device operations by associating two lists of active transmission configuration indicator (TCI) states with the serving cell. The data communication operations module 422 may be configured to handle the serving cell as a multi-DCI mode cell in wireless device operations by including the serving cell in a list of serving cells provided with CORESETPoolIndex values of both zero and one for calculating physical downlink control channel (PDDCH) candidates and/or non-overlapped control channel element (CCE) limits.

FIGS. 5A and 5B illustrate two examples of cross-carrier scheduling. With reference to FIGS. 1-5B, a first case is illustrated in FIG. 5A in which a CC1 is the scheduling cell for a CC3 (CC1's scheduled cell) and a CC2 is a scheduling cell for CC4 (CC2's scheduled cell). FIG. 5A illustrates that while CC1 may be associated with a CORESETPoolIndex=0, its scheduled cell (CC3) may have no CORESET configured for it when CC3 is cross-carrier scheduled. Similarly, while CC2 may be associated with CORESET-PoolIndex=1, its scheduled cell (CC4) may have no CORESET configured for it when CC4 is cross-carrier scheduled. CC0 is illustrated in FIG. 5A as a multi-DCI MTRP cell having two CORESETPoolIndex values configured, CORE-SETPoolIndex=0 associated with a TRP0 and CORESET-PoolIndex=1 associated with a TRP1. CC0 is not illustrated as a scheduling cell in FIG. 5A.

A second case is illustrated in FIG. 5B, where a CC0 is as a multi-DCI MTRP cell having two CORESETPoolIndex values configured, CORESETPoolIndex=0 associated with a TRP0 and CORESETPoolIndex=1 associated with a TRP1, and the CC0 is a scheduling cell of another CC1 (i.e., CC1 is the scheduled cell. FIG. 5B illustrates that while CC0 may be associated with both CORESETPoolIndex=1 and CORESETPoolIndex=2, its scheduled cell (CC1) may have no CORESET configured for it when CC1 is cross-carrier scheduled.

Figure 5C:
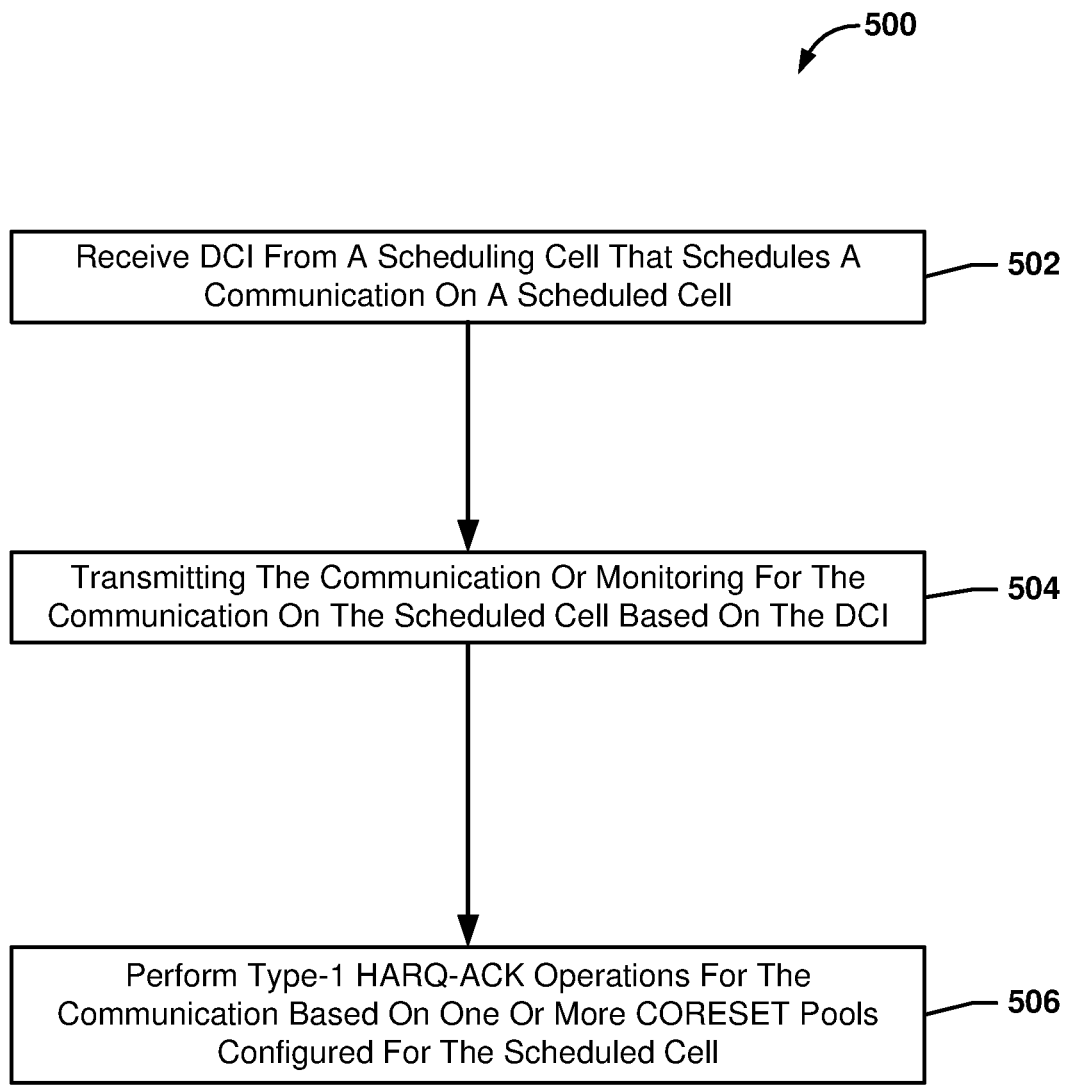
FIG. 5C is a process flow diagram illustrating a method that may be performed by a processor of a wireless device for managing cross-carrier scheduling according to various embodiments.

FIG. 5C is a process flow diagram illustrating a method 500 that may be performed by a processor of a wireless device for managing cross-carrier scheduling according to various embodiments. With reference to FIGS. 1-5C, the method 500 may be implemented by a processor (e.g., 212, 216, 252 or 260) of a wireless device (e.g., the wireless device 120a-120e, 120, 200, 320). With reference to FIGS. 1-5C, means for performing each of the operations of the method 500 may be one or more processors of a wireless device (e.g., the wireless device 120a-120e, 120, 200, 320), such as one or more of the processors 212, 216, 252 or 260 and/or the like.

In block 502, the processor may perform operations including receiving DCI from a scheduling cell that schedules a communication on a scheduled cell. In some embodiments, receiving the DCI may include receiving the DCI on a PDCCH. In various embodiments, the DCI may be received after receiving one or more RRC messages indicating at least one serving cell is configured with two CORESETPoolIndex values and indicating that at least one serving cell without a configured CORESETPoolIndex value that is cross-carrier scheduled.

In block 504, the processor may perform operations including transmitting the communication or monitor for the communication on the scheduled cell based on the DCI. For example, the communication may be transmitted when the communication is an uplink communication and the communication may be monitored for when the communication is a downlink communication.

In block 506, the processor may perform operations including performing Type-1 HARQ-ACK operations for the communication based on one or more CORESET pools configured for the scheduled cell. For example, the processor may perform Type-1 HARQ-ACK operations for a first set of serving cells associated with a first of two CORESETPoolIndex values to generate a first codebook and a second set of serving cells associated with a second set of the two CORESETPoolIndex values to generate a second codebook. In various embodiments, performing Type-1 HARQ-ACK operations may include transmitting joint feedback for the Type-1 HARQ-ACK operations on a same PUCCH resource after concatenating the first codebook and the second codebook.

Figure 5D:
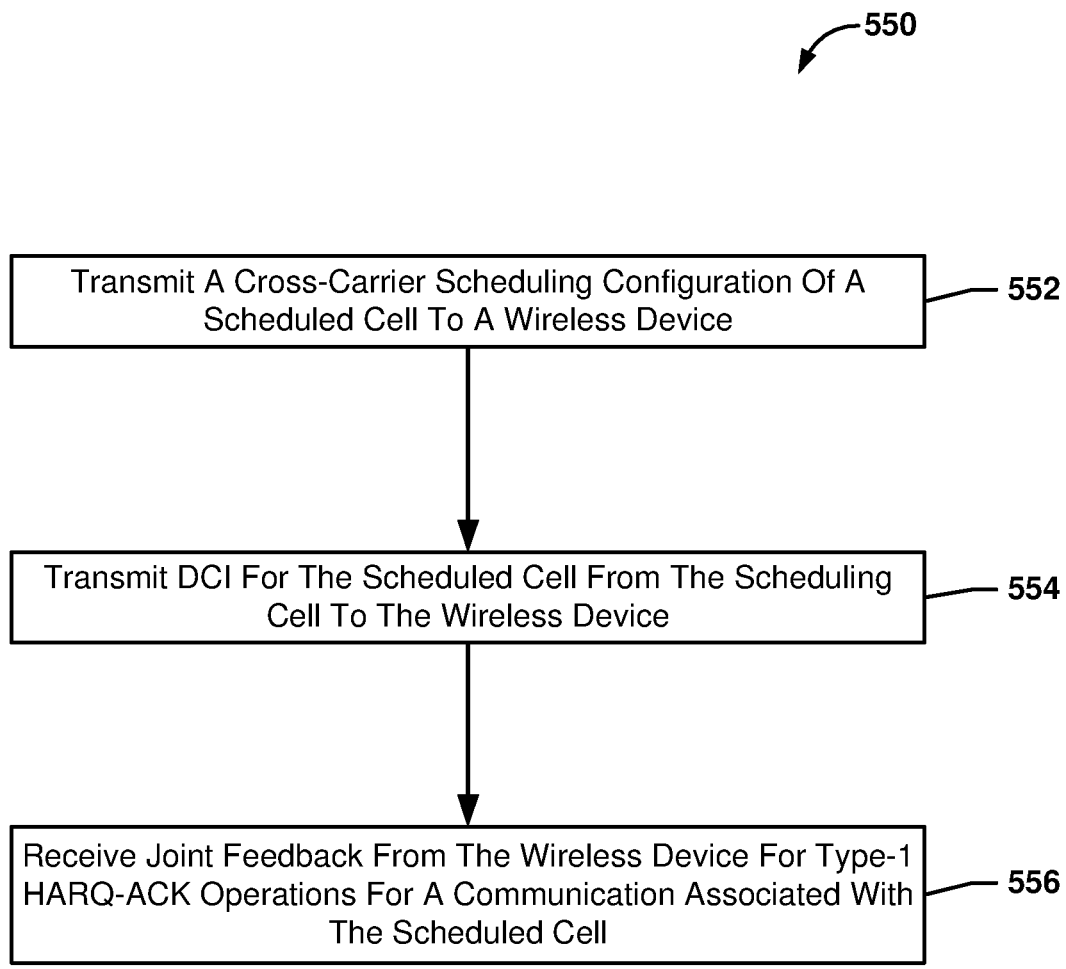
FIG. 5D is a process flow diagram illustrating a method that may be performed by a processor of a network computing device for managing cross-carrier scheduling according to various embodiments.

FIG. 5D is a process flow diagram illustrating a method 550 that may be performed by a processor of a network computing device for managing cross-carrier scheduling according to various embodiments. With reference to FIGS. 1-5D, the method 550 may be implemented by a processor of a network computing device (e.g., the base station 110a-e, 110, 350). In some embodiments, the operations of the method 550 may be performed in conjunction with the operations of the method 500 (FIG. 5C). With reference to FIGS. 1-5D, means for performing each of the operations of the method 550 may be one or more processors of a network computing device (e.g., the base station 110a-e, 110, 350).

In block 552, the processor may perform operations including transmitting a cross-carrier scheduling configuration of a scheduled cell to a wireless device. In some embodiments, the cross-carrier scheduling configuration may indicate an associated CORESETPoolIndex value of a scheduling cell configured to schedule the scheduled cell. In some embodiments, the cross-carrier scheduling configuration may be sent as a RRC message to the wireless device. As an example, the processor may generate the cross-carrier scheduling configuration of a scheduled cell based on the scheduling settings for a cell set by a network operator. In various embodiments, the cross-carrier scheduling configuration may indicate that at least one serving cell is configured with two CORESETPoolIndex and no CORESETPoolIndex value of the scheduled cell is configured.

In block 554, the processor may perform operations including transmitting DCI for the scheduled cell from the scheduling cell to the wireless device. In some embodiments, transmitting DCI for the scheduled cell from the scheduling cell to the wireless device may include transmitting DCI on a PDCCH to the wireless device. As an example, the transmitted DCI may be the DCI received by the wireless device as discussed with reference to block 502 of method 500 (FIG. 5C).

In block 556, the processor may perform operations including receiving joint feedback from the wireless device for Type-1 HARQ-ACK operations for a communication associated with the scheduled cell. In some embodiments, the joint feedback from the wireless device may be received on a PUCCH resource from the wireless device. As an example, the joint feedback may be joint feedback transmitted by the wireless device as discussed with reference to block 506 of method 500 (FIG. 5C).

Figure 6A:
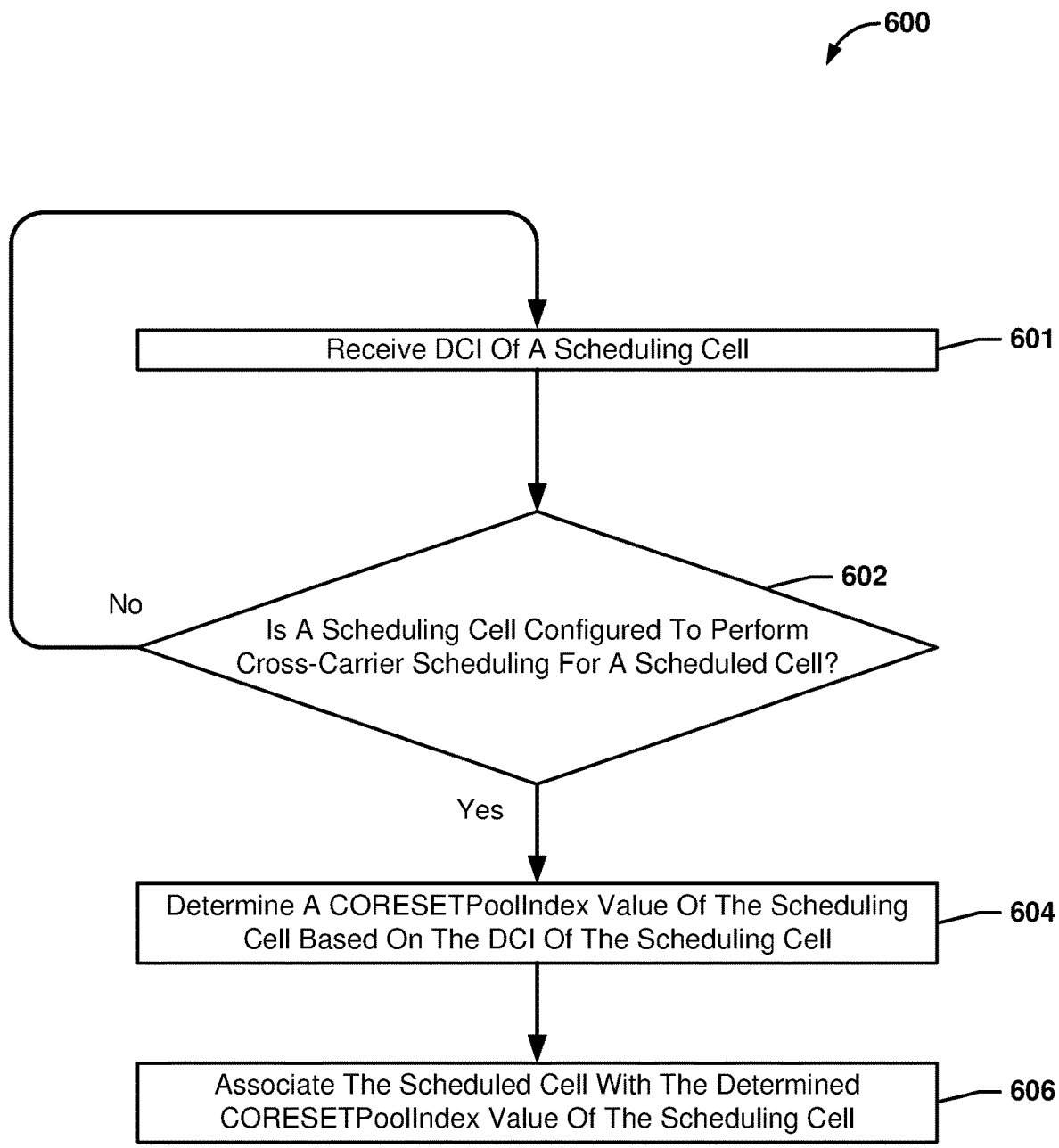
FIG. 6A is a process flow diagram illustrating a method that may be performed by a processor of a wireless device for managing cross-carrier scheduling according to various embodiments.

FIG. 6A is a process flow diagram illustrating a method 600 that may be performed by a processor of a wireless device for managing cross-carrier scheduling according to various embodiments. With reference to FIGS. 1-6A, the method 600 may be implemented by a processor (e.g., 212, 216, 252 or 260) of a wireless device (e.g., the wireless device 120a-120e, 120, 200, 320). In various embodiments, the operations of method 600 may be performed in conjunction with the operations of method 500 (FIG. 5C) and/or 550 (FIG. 5D). As an example, the operations of method 600 may be example operations of blocks 502, 504, and/or 506 of method 500 (FIG. 5C) to support Type-1 HARQ-ACK operations. With reference to FIGS. 1-6A, means for performing each of the operations of the method 600 may be one or more processors of a wireless device (e.g., the wireless device 120a-120e, 120, 200, 320), such as one or more of the processors 212, 216, 252 or 260 and/or the like.

In block 601, the processor may perform operations including receiving DCI of a scheduling cell. In various embodiments, the DCI may be transmitted by the scheduling cell to the wireless device. DCI may indicate whether or not a cell is self-scheduling and/or whether a cell is scheduling other cells or being scheduled by other cells.

In determination block 602, the processor may perform operations including determining whether a scheduling cell is configured to perform cross-carrier scheduling for a scheduled cell. The processor may perform operations including determining whether a scheduling cell is configured to perform cross-carrier scheduling for a scheduled cell based on RRC configurations and/or DCI of the scheduling cell. For example, the processor may parse cross-carrier scheduling configuration elements in a RRC configuration (e.g., CrossCarrierSchedulingConfig, etc.) and/or DCI, such as a CIF, to determine whether a scheduling cell is configured to perform cross-carrier scheduling for a scheduled cell. As a specific example, the determination as to whether a scheduling cell is configured to perform cross-carrier scheduling for a scheduled cell may be based on the RRC configuration (e.g., CrossCarrierSchedulingConfig). Then the DCI (e.g., via the CIF field) indicates whether that DCI is for the scheduled cell (or is for another cell).

In response to determining that a scheduling cell is not configured to perform cross-carrier scheduling for a scheduled cell (i.e., determination block 602="No"), the processor may perform operations of block 601 to receive DCI of a scheduling cell.

In response to determining that a scheduling cell is configured to perform cross-carrier scheduling for a scheduled cell (i.e., determination block 602="No"), the processor may perform operations including determining a CORESETPoolIndex value of the scheduling cell in block 604. In some embodiments, determining a CORESETPoolIndex value of the scheduling cell may be based on the RRC configuration and/or the DCI of the scheduling cell. In some embodiments, determining a CORESETPoolIndex value of the scheduling cell may include determining the CORESETPoolIndex value of the scheduling cell as zero in response to the CORESETPoolIndex value of the scheduling cell being indicated as zero in the RRC configuration and/or DCI of the scheduling cell or no CORESETPoolIndex value being configured in the DCI of the scheduling cell. In some embodiments, determining a CORESETPoolIndex value of the scheduling cell may include determining the CORESETPoolIndex value of the scheduling cell as one in response to the CORESETPoolIndex value of the scheduling cell being indicated as one in the RRC configuration and/or DCI of the scheduling cell. In some embodiments, determining a CORESETPoolIndex value of the scheduling cell may include determining the CORESETPoolIndex value of the scheduling cell as zero in response to the CORESETPoolIndex value configured for CORESETs in the scheduling cell being indicated as zero or no CORESETPoolIndex value being configured for the CORESETs in the scheduling cell. In some embodiments, determining a CORESETPoolIndex value of the scheduling cell may include determining the CORESETPoolIndex value of the scheduling cell as one in response to the CORESETPoolIndex value configured for the CORESETs in the scheduling cell being indicated as one.

In block 606, the processor may perform operations including associating the scheduled cell with the determined CORESETPoolIndex value of the scheduling cell. In this manner, the scheduled cell may be associated with the same CORESETPoolIndex value as its respective scheduling cell.

Figure 6B:
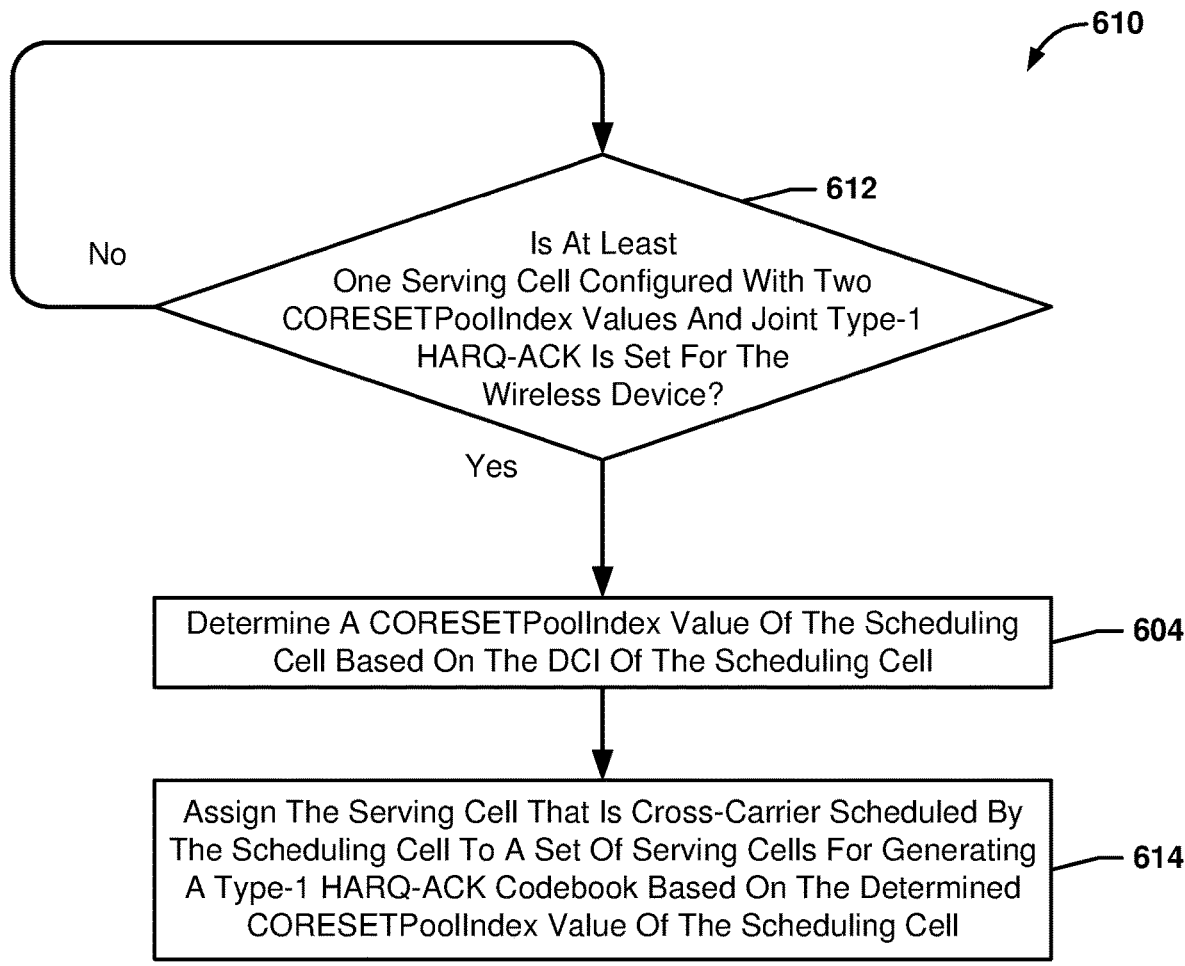
FIG. 6B is a process flow diagram illustrating a method that may be performed by a processor of a wireless device for managing cross-carrier scheduling according to various embodiments.

FIG. 6B is a process flow diagram illustrating a method 610 that may be performed by a processor of a wireless device for managing cross-carrier scheduling according to various embodiments. With reference to FIGS. 1-6B, the method 610 may be implemented by a processor (e.g., 212, 216, 252 or 260) of a wireless device (e.g., the wireless device 120a-120e, 120, 200, 320). In various embodiments, the operations of method 610 may be performed in conjunction with the operations of method 500 (FIG. 5C), method 550 (FIG. 5D), and/or method 600 (FIG. 6A). As an example, the operations of method 610 may be examples of operations performed in block 506 of method 500 (FIG. 5C) to support Type-1 HARQ-ACK operations. With reference to FIGS. 1-6B, means for performing each of the operations of the method 610 may be one or more processors of a wireless device (e.g., the wireless device 120a-120e, 120, 200, 320), such as one or more of the processors 212, 216, 252 or 260 and/or the like.

In determination block 612, the processor may perform operations including determining whether at least one serving cell is configured with two CORESETPoolIndex values and joint Type-1 HARQ-ACK is set for the wireless device.

In response to determining that no serving cell is configured with two CORESETPoolIndex values or joint Type-1 HARQ-ACK is not set for the wireless device (i.e., determination block 612="No"), the processor may continue to perform operations including determining whether at least one serving cell is configured with two CORESETPoolIndex values and joint Type-1 HARQ-ACK is set for the wireless device in block 612.

In response to determining that at least one serving cell is configured with two CORESETPoolIndex values and joint Type-1 HARQ-ACK is set for the wireless device (i.e., determination block 612="Yes"), the processor may perform operations including determining a CORESETPoolIndex value of the scheduling cell in block 604 as discussed with reference to method 600 (FIG. 6A). In some embodiments, the operations of block 604 may be performed for each serving cell that is cross-carrier scheduled by a scheduling cell.

In block 614, the processor may perform operations including assigning the serving cell that is cross-carrier scheduled by the scheduling cell to a set of serving cells for generating a Type-1 HARQ-ACK codebook based on the determined CORESETPoolIndex value of the scheduling cell. In some embodiments, assigning the serving cell that is cross-carrier scheduled by the scheduling cell to the set of serving cells for generating the Type-1 HARQ-ACK codebook based on the determined CORESETPoolIndex value of the scheduling cell may include assigning the serving cell that is cross-carrier scheduled by the scheduling cell to a first set (e.g., S0) of serving cells for generating a first Type-1 HARQ-ACK codebook based on the determined CORESETPoolIndex value of the scheduling cell being zero and assigning the serving cell that is cross-carrier scheduled by the scheduling cell to a second set (e.g., S1) of serving cells for generating a second Type-1 HARQ-ACK codebook based on the determined CORESETPoolIndex value of the scheduling cell being one.

Figure 7:
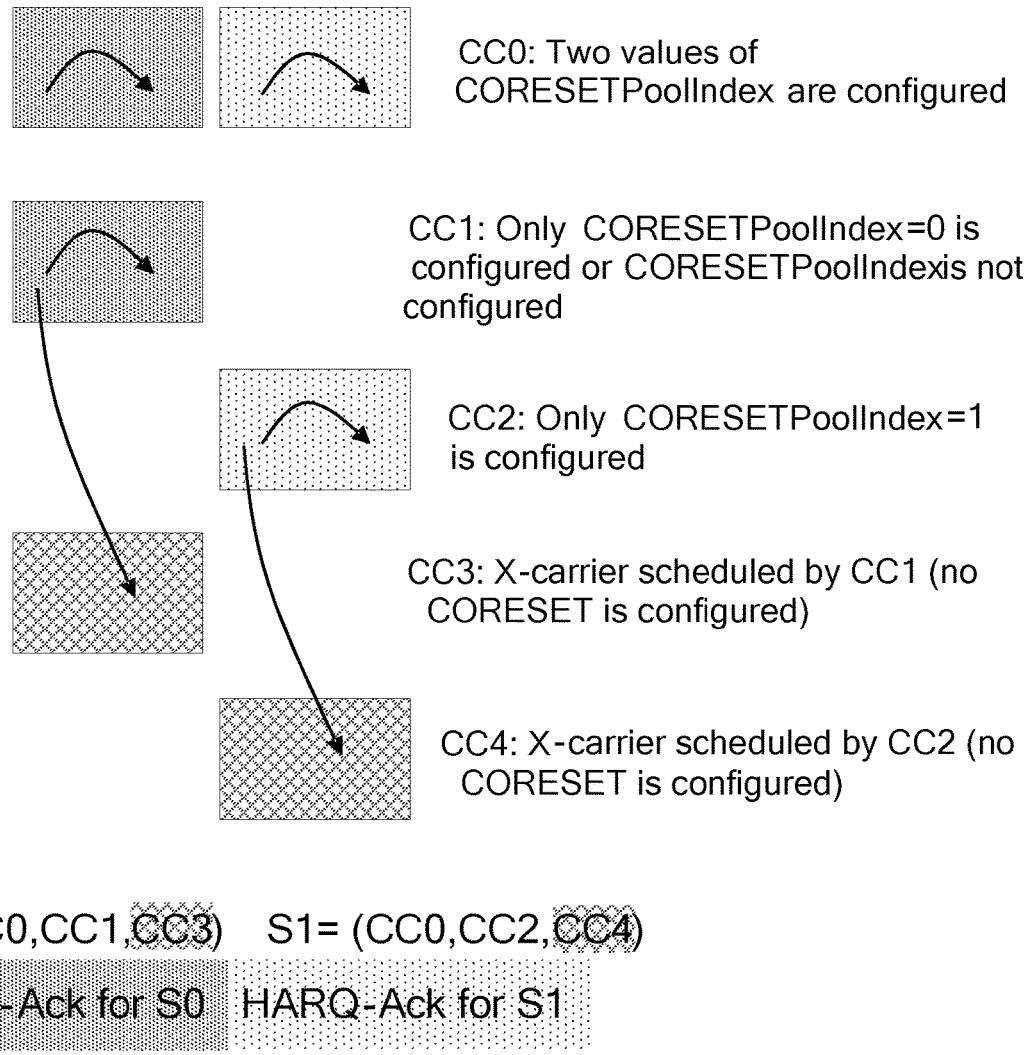
FIG. 7 illustrates an example of cross-carrier scheduling supporting joint-semi-static hybrid automatic repeat request (HARQ) acknowledgement (HARQ-ACK) according to various embodiments.

FIG. 7 illustrates an example of cross-carrier scheduling supporting joint-semi-static HARQ-ACK according to various embodiments. With reference to FIGS. 1-7, FIG. 7 illustrates example joint-semi-static HARQ-ACK operations according to the operations of method 610 (FIG. 6B). For example, according to the operations of method 610 (FIG. 6B), CC3 may be determined to be scheduled by CC1 and as the CORESETPoolIndex value of CC1 is zero, CC3 may be added to list S0 for HARQ-ACK. Similarly, CC4 may be determined to be scheduled by CC2 and as the CORESETPoolIndex value of CC2 is one, CC4 may be added to list S1 for HARQ-ACK.

Figure 8A:
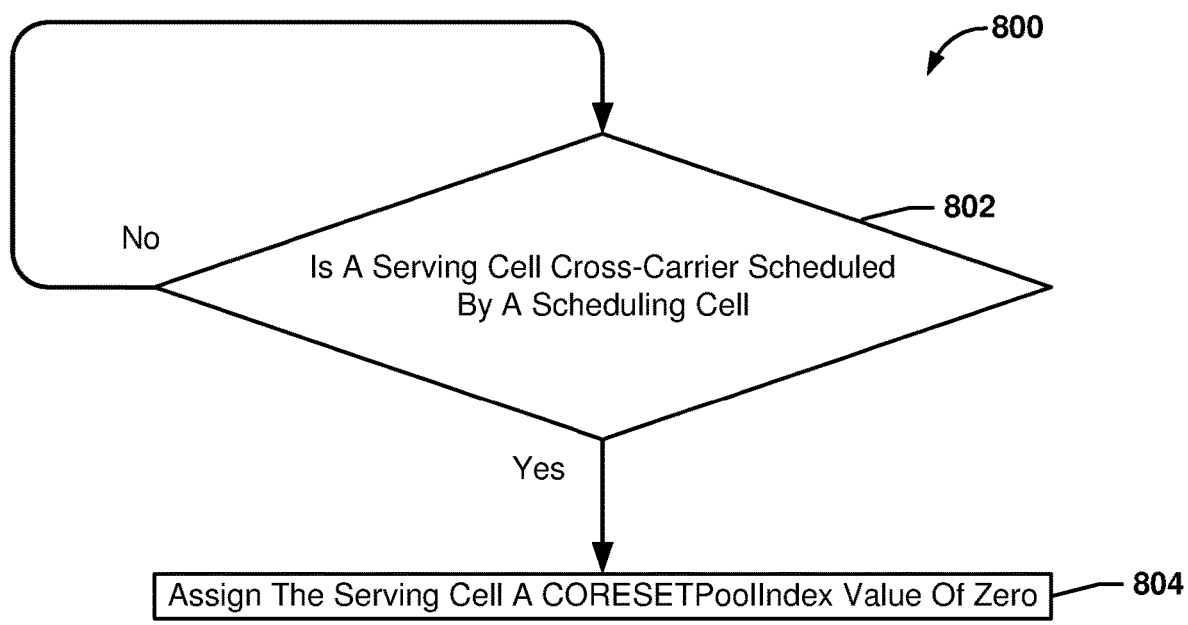
FIG. 8A is a process flow diagram illustrating a method that may be performed by a processor of a wireless device for managing cross-carrier scheduling according to various embodiments.

FIG. 8A is a process flow diagram illustrating a method 800 that may be performed by a processor of a wireless device for managing cross-carrier scheduling according to various embodiments. With reference to FIGS. 1-8A, the method 800 may be implemented by a processor (e.g., 212, 216, 252 or 260) of a wireless device (e.g., the wireless device 120a-120e, 120, 200, 320). In various embodiments, the operations of method 800 may be performed in conjunction with the operations of method 500 (FIG. 5C), method 550 (FIG. 5D), method 600 (FIG. 6A), and/or method 610 (FIG. 6B). As an example, the operations of method 800 may be examples of operations performed in block 506 of method 500 (FIG. 5C) to support Type-1 HARQ-ACK operations. With reference to FIGS. 1-8A, means for performing each of the operations of the method 800 may be one or more processors of a wireless device (e.g., the wireless device 120a-120e, 120, 200, 320), such as one or more of the processors 212, 216, 252 or 260 and/or the like.

In determination block 802, the processor may perform operations including determining whether a serving cell is cross-carrier scheduled by a scheduling cell. For example, the processor may parse cross-carrier scheduling configuration elements in DCI and/or cross-carrier scheduling configuration elements received via RRC to determine whether a serving cell is cross-carrier scheduled by a scheduling cell. For example, values in a CIF and/or an associated CORESETPoolIndexValue element in cross-carrier scheduling configuration may indicate whether or not a serving cell is cross-carrier scheduled by a scheduling cell.

In response to determining that a serving cell is not cross-carrier scheduled by a scheduling cell (i.e., determination block 802="No"), the processor may continue to perform operations including determining whether a serving cell is cross-carrier scheduled by a scheduling cell in determination block 802.

In response to determining that a serving cell is cross-carrier scheduled by a scheduling cell (i.e., determination block 802="Yes"), the processor may perform operations including assigning the serving cell a CORESETPoolIndex value of zero in response to determining that the serving cell is cross-carrier scheduled by the scheduling cell in block 804.

Figure 8B:
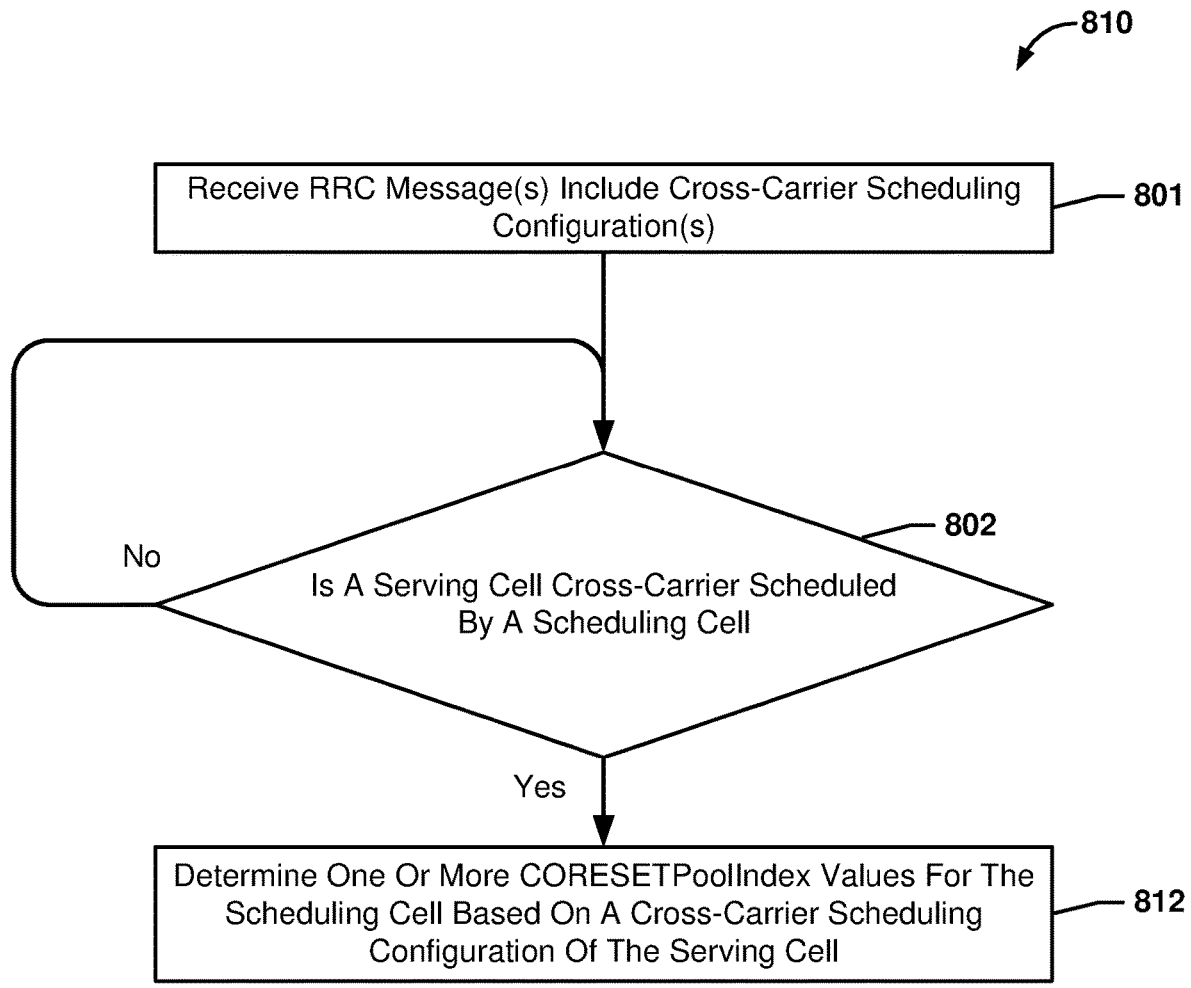
FIG. 8B is a process flow diagram illustrating a method that may be performed by a processor of a wireless device for managing cross-carrier scheduling according to various embodiments.

FIG. 8B is a process flow diagram illustrating a method 810 that may be performed by a processor of a wireless device for managing cross-carrier scheduling according to various embodiments. With reference to FIGS. 1-8B, the method 810 may be implemented by a processor (e.g., 212, 216, 252 or 260) of a wireless device (e.g., the wireless device 120a-120e, 120, 200, 320). In various embodiments, the operations of method 810 may be performed in conjunction with the operations of method 500 (FIG. 5C), method 550 (FIG. 5D), method 600 (FIG. 6A), and/or method 610 (FIG. 6B). As an example, the operations of method 810 may be examples of operations performed in block 506 of method 500 (FIG. 5C) to support Type-1 HARQ-ACK operations. With reference to FIGS. 1-8B, means for performing each of the operations of the method 810 may be one or more processors of a wireless device (e.g., the wireless device 120a-120e, 120, 200, 320), such as one or more of the processors 212, 216, 252 or 260 and/or the like.

In block 801, the processor may perform operations including receiving one or more RRC messages including one or more cross-carrier scheduling configurations. In some embodiments, cross-carrier scheduling configuration elements may indicate whether a serving cell is cross-carrier scheduled by a scheduling cell. For example, values in a CIF and/or an associated CORESETPoolIndexValue element in cross-carrier scheduling configuration may indicate whether or not a serving cell is cross-carrier scheduled by a scheduling cell. In various embodiments, one or more RRC messages including one or more cross-carrier scheduling configurations may be received from a network computing device.

In determination block 802, the processor may perform operations including determining whether a serving cell is cross-carrier scheduled by a scheduling cell as discussed with reference to method 800 (FIG. 8A).

In response to determining that a serving cell is not cross-carrier scheduled by a scheduling cell (i.e., determination block 802="No"), the processor may continue to perform operations including determining whether a serving cell is cross-carrier scheduled by a scheduling cell in determination block 802 as discussed with reference to method 800 (FIG. 8A).

In response to determining that a serving cell is cross-carrier scheduled by a scheduling cell (i.e., determination block 802="Yes"), the processor may perform operations including determining one or more CORESETPoolIndex values for the scheduling cell based on a cross-carrier scheduling configuration of the serving cell in block 812. As examples, the processor may determine whether the CORESETPoolIndex value is zero, the processor may determine whether the CORESETPoolIndex value is one, and/or the processor may determine whether the CORESETPoolIndex value is both zero and one.

Figure 8C:
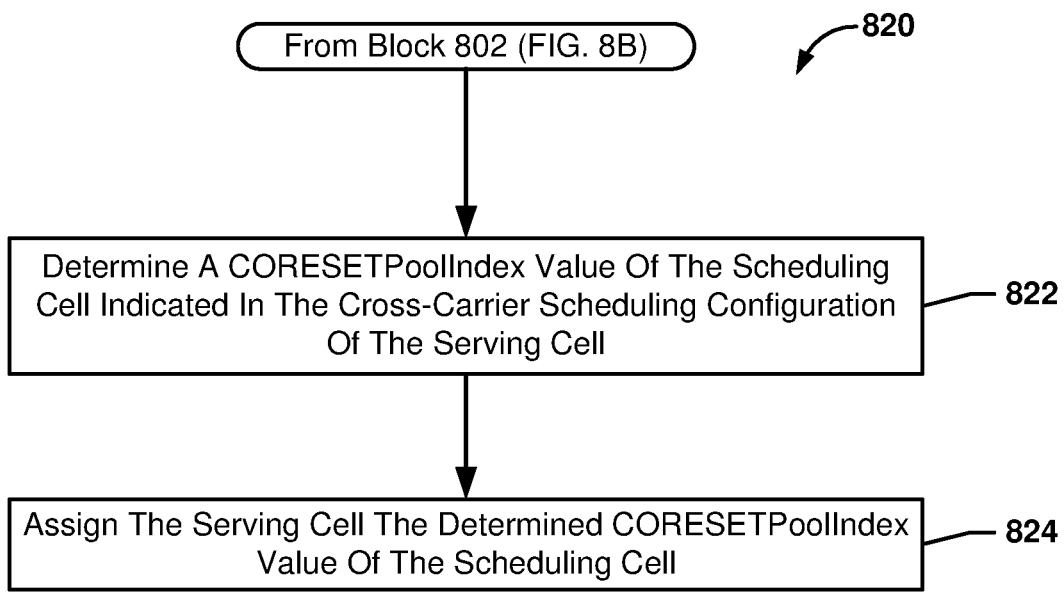
FIG. 8C is a process flow diagram illustrating a method that may be performed by a processor of a wireless device for managing cross-carrier scheduling according to various embodiments.

FIG. 8C is a process flow diagram illustrating a method 820 that may be performed by a processor of a wireless device for managing cross-carrier scheduling according to various embodiments. With reference to FIGS. 1-8C, the method 820 may be implemented by a processor (e.g., 212, 216, 252 or 260) of a wireless device (e.g., the wireless device 120a-120e, 120, 200, 320). In various embodiments, the operations of method 820 may be performed in conjunction with the operations of method 500 (FIG. 5C), method 550 (FIG. 5D), method 600 (FIG. 6A), method 610 (FIG. 6B), and/or method 810 (FIG. 8B). As a specific example, the method 820 may be performed to determine one or more CORESETPoolIndex values for the scheduling cell based on a cross-carrier scheduling configuration of the serving cell in response to determining that a serving cell is cross-carrier scheduled by a scheduling cell (i.e., determination block 802 (FIG. 8B)="Yes"). As another example, the operations of method 820 may be examples of operations performed in block 506 of method 500 (FIG. 5C) to support Type-1 HARQ-ACK operations. With reference to FIGS. 1-8C, means for performing each of the operations of the method 820 may be one or more processors of a wireless device (e.g., the wireless device 120a-120e, 120, 200, 320), such as one or more of the processors 212, 216, 252 or 260 and/or the like.

In block 822, the processor may perform operations including determining a CORESETPoolIndex value of the scheduling cell indicated in the cross-carrier scheduling configuration. In some embodiments, the determined CORESETPoolIndex value of the scheduling cell may be a value of zero or a value of one.

In block 824, the processor may perform operations including assigning the serving cell the determined CORESETPoolIndex value of the scheduling cell.

Figure 8D:
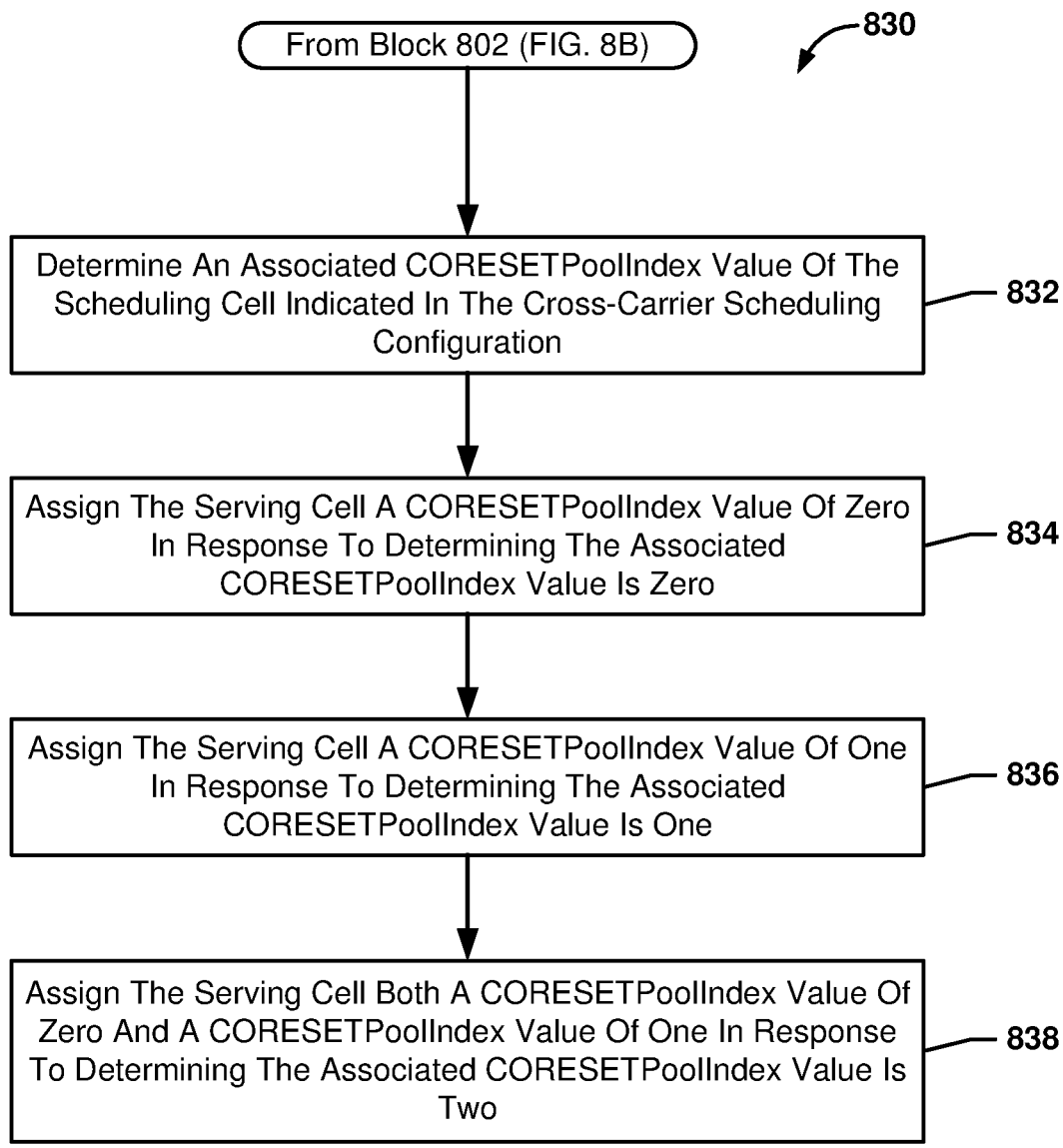
FIG. 8D is a process flow diagram illustrating a method that may be performed by a processor of a wireless device for managing cross-carrier scheduling according to various embodiments.

FIG. 8D is a process flow diagram illustrating a method 830 that may be performed by a processor of a wireless device for managing cross-carrier scheduling according to various embodiments. With reference to FIGS. 1-8D, the method 830 may be implemented by a processor (e.g., 212, 216, 252 or 260) of a wireless device (e.g., the wireless device 120a-120e, 120, 200, 320). In various embodiments, the operations of method 830 may be performed in conjunction with the operations of method 500 (FIG. 5C), method 550 (FIG. 5D), method 600 (FIG. 6A), method 610 (FIG. 6B), and/or method 810 (FIG. 8B). As a specific example, the method 830 may be performed to determine one or more CORESETPoolIndex values for the scheduling cell based on a cross-carrier scheduling configuration of the serving cell in response to determining that a serving cell is cross-carrier scheduled by a scheduling cell (i.e., determination block 802 (FIG. 8B)="Yes"). As another example, the operations of method 830 may be examples of operations performed in block 506 of method 500 (FIG. 5C) to support Type-1 HARQ-ACK operations. With reference to FIGS. 1-8D, means for performing each of the operations of the method 830 may be one or more processors of a wireless device (e.g., the wireless device 120a-120e, 120, 200, 320), such as one or more of the processors 212, 216, 252 or 260 and/or the like.

In block 832, the processor may perform operations including determining an associated CORESETPoolIndex value of the scheduling cell indicated in the cross-carrier scheduling configuration. For example, the processor may determine whether the associated CORESETPoolIndex value is zero, the processor may determine whether the associated CORESETPoolIndex value is one, and/or the processor may determine whether the associated CORESETPoolIndex value is two.

In block 834, the processor may perform operations including assigning the serving cell a CORESETPoolIndex value of zero in response to determining the associated CORESETPoolIndex value is zero.

In block 836, the processor may perform operations including assigning the serving cell a CORESETPoolIndex value of one in response to determining the associated CORESETPoolIndex value is one.

In block 838, the processor may perform operations including assigning the serving cell both a CORESETPoolIndex value of zero and a CORESETPoolIndex value of one in response to determining the associated CORESETPoolIndex value is two.

Figure 9A:
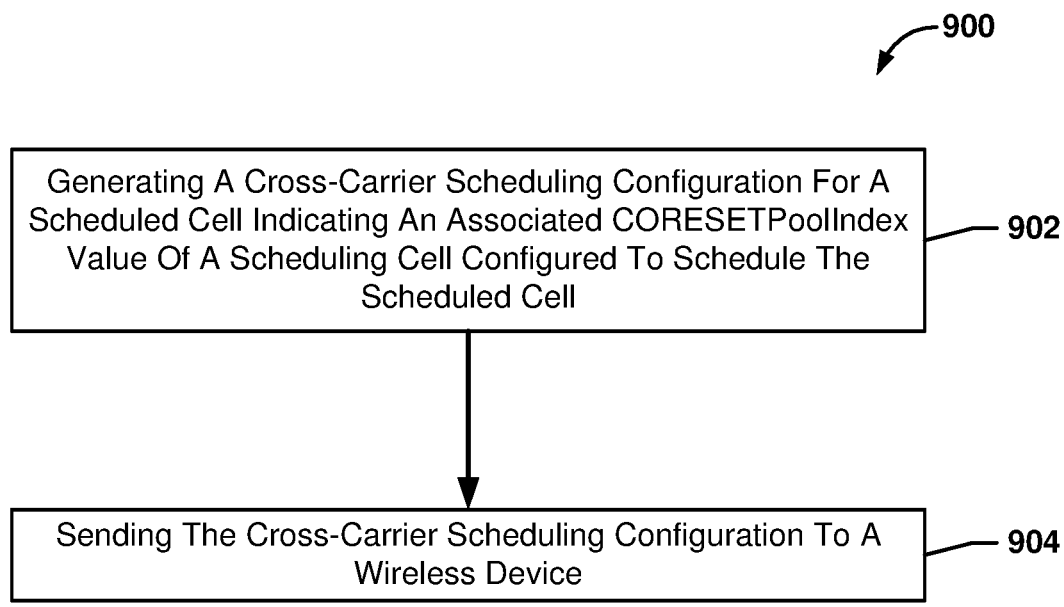
FIG. 9A is a process flow diagram illustrating a method that may be performed by a processor of a network computing device for managing cross-carrier scheduling according to various embodiments.

FIG. 9A is a process flow diagram illustrating a method 900 that may be performed by a processor of a network computing device for managing cross-carrier scheduling according to various embodiments. With reference to FIGS. 1-9A, the method 900 may be implemented by a processor of a network computing device (e.g., the base station 110a-e, 110, 350). In various embodiments, the operations of method 900 may be performed in conjunction with the operations of method 500 (FIG. 5B), method 550 (FIG. 5C), method 600 (FIG. 6A), method 610 (FIG. 6B), method 800 (FIG. 8A), method 810 (FIG. 8B), method 820 (FIG. 8C), and/or method 830 (FIG. 8D). As an example, the operations of method 900 may be examples of operations performed in block 552 of method 550 (FIG. 5D) to enable transmission of a cross-carrier scheduling configuration. With reference to FIGS. 1-9A, means for performing each of the operations of the method 900 may be one or more processors of a network computing device (e.g., the base station 110a-e, 110, 350).

In block 902, the processor may perform operations including generating a cross-carrier scheduling configuration for a scheduled cell indicating an associated CORESETPoolIndex value of a scheduling cell configured to schedule the scheduled cell. For example, the processor may generate the cross-carrier scheduling configuration for a scheduled cell based on the scheduling settings for a cell set by a network operator.

In block 904, the processor may perform operations including sending the cross-carrier scheduling configuration to a wireless device. In various embodiments, sending the cross-carrier scheduling configuration to a wireless device may include sending the cross-carrier scheduling configuration to a wireless device in an RRC message.

FIG. 9B illustrates an example cross-carrier scheduling schema 950 according to various embodiments. With reference to FIGS. 1-9B, the schema 950 may be generated according to the operations of method 900 (FIG. 9A). The schema 950 illustrates an information element (IE) associatedCORESETPoolIndexValue 952. The associatedCORESETPoolIndexValue 952 may indicate and/or correspond to the CORESETPoolIndex value of a scheduling cell that is scheduling a scheduled cell. In some embodiments, the associatedCORESETPoolIndexValue 952 may be an integer value of zero indicating the CORESETPoolIndex value of a scheduling cell is zero. In some embodiments, the associatedCORESETPoolIndexValue 952 may be an integer value of zero indicating the CORESETPoolIndex value of a scheduling cell is one. In some embodiments, the associatedCORESETPoolIndexValue 952 may be an integer value of 2 indicating the CORESETPoolIndex value of a scheduling cell is both zero and one (for example when the scheduling cell is a multi-DCI mode cell implementing MTRP.

Figure 10A:
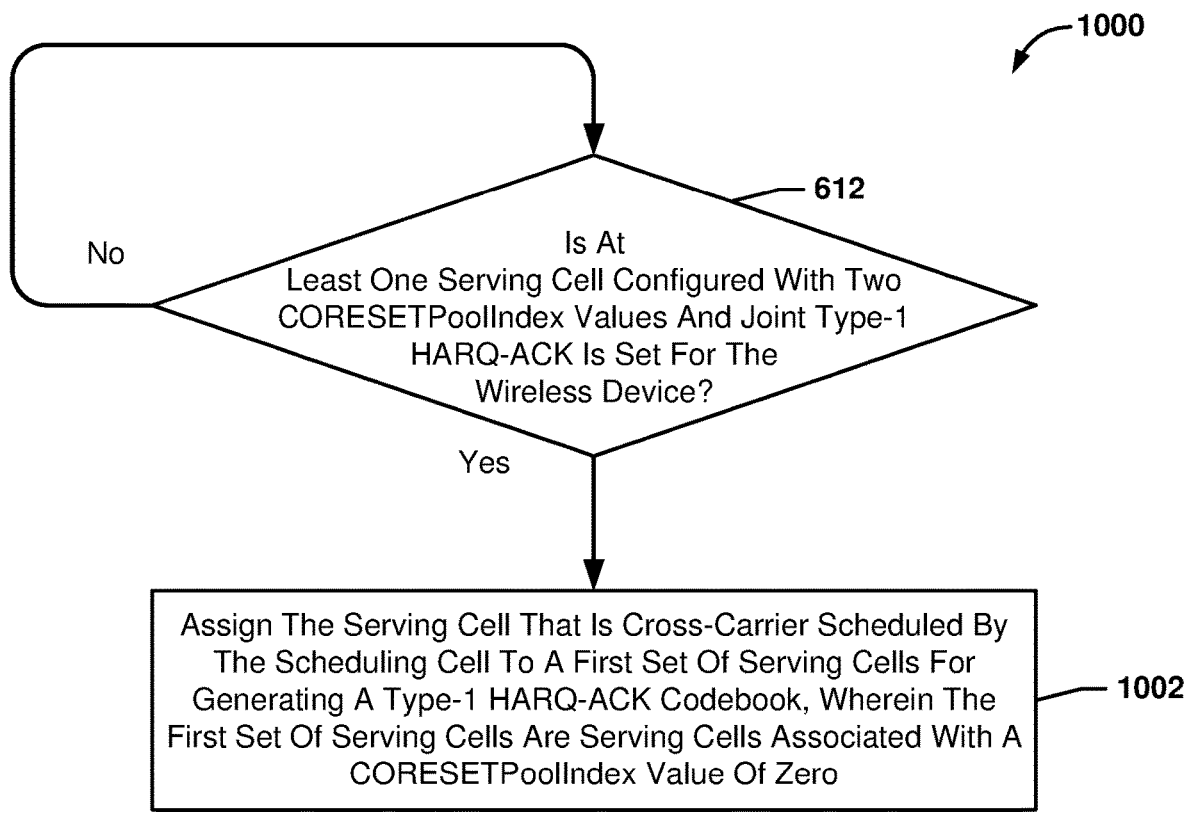
FIG. 10A is a process flow diagram illustrating a method that may be performed by a processor of a wireless device for managing cross-carrier scheduling according to various embodiments.

FIG. 10A is a process flow diagram illustrating a method 1000 that may be performed by a processor of a wireless device for managing cross-carrier scheduling according to various embodiments. With reference to FIGS. 1-10A, the method 1000 may be implemented by a processor (e.g., 212, 216, 252 or 260) of a wireless device (e.g., the wireless device 120a-120e, 120, 200, 320). In various embodiments, the operations of method 1000 may be performed in conjunction with the operations of method 500 (FIG. 5C), method 550 (FIG. 5D), method 600 (FIG. 6A), method 610 (FIG. 6B), method 800 (FIG. 8A), and/or method 900 (FIG. 9A). As an example, the operations of method 1000 may be examples of operations performed in block 506 of method 500 (FIG. 5C) to support Type-1 HARQ-ACK operations. With reference to FIGS. 1-10A, means for performing each of the operations of the method 1000 may be one or more processors of a wireless device (e.g., the wireless device 120a-120e, 120, 200, 320), such as one or more of the processors 212, 216, 252 or 260 and/or the like.

In determination block 612, the processor may perform operations including determining whether at least one serving cell is configured with two CORESETPoolIndex values and joint Type-1 HARQ-ACK is set for the wireless device as discussed with reference to method 610 (FIG. 6B).

In response to determining that no serving cell is configured with two CORESETPoolIndex values or joint Type-1 HARQ-ACK is not set for the wireless device (i.e., determination block 612="No"), the processor may continue to perform operations including determining whether at least one serving cell is configured with two CORESETPoolIndex values and joint Type-1 HARQ-ACK is set for the wireless device in block 612 as discussed with reference to method 610 (FIG. 6B).

In response to determining that at least one serving cell is configured with two CORESETPoolIndex values and joint Type-1 HARQ-ACK is set for the wireless device (i.e., determination block 612="Yes"), the processor may perform operations including assigning the serving cell that is cross-carrier scheduled by the scheduling cell to a first set of serving cells for generating a Type-1 HARQ-ACK codebook, wherein the first set of serving cells are serving cells associated with a CORESETPoolIndex value of zero in block 1002. In various embodiments, the assigning the serving cell that is cross-carrier scheduled by the scheduling cell to a first set of serving cells for generating a Type-1 HARQ-ACK codebook may be performed for each serving cell that is cross-carrier scheduled by a scheduling cell.

Figure 10B:
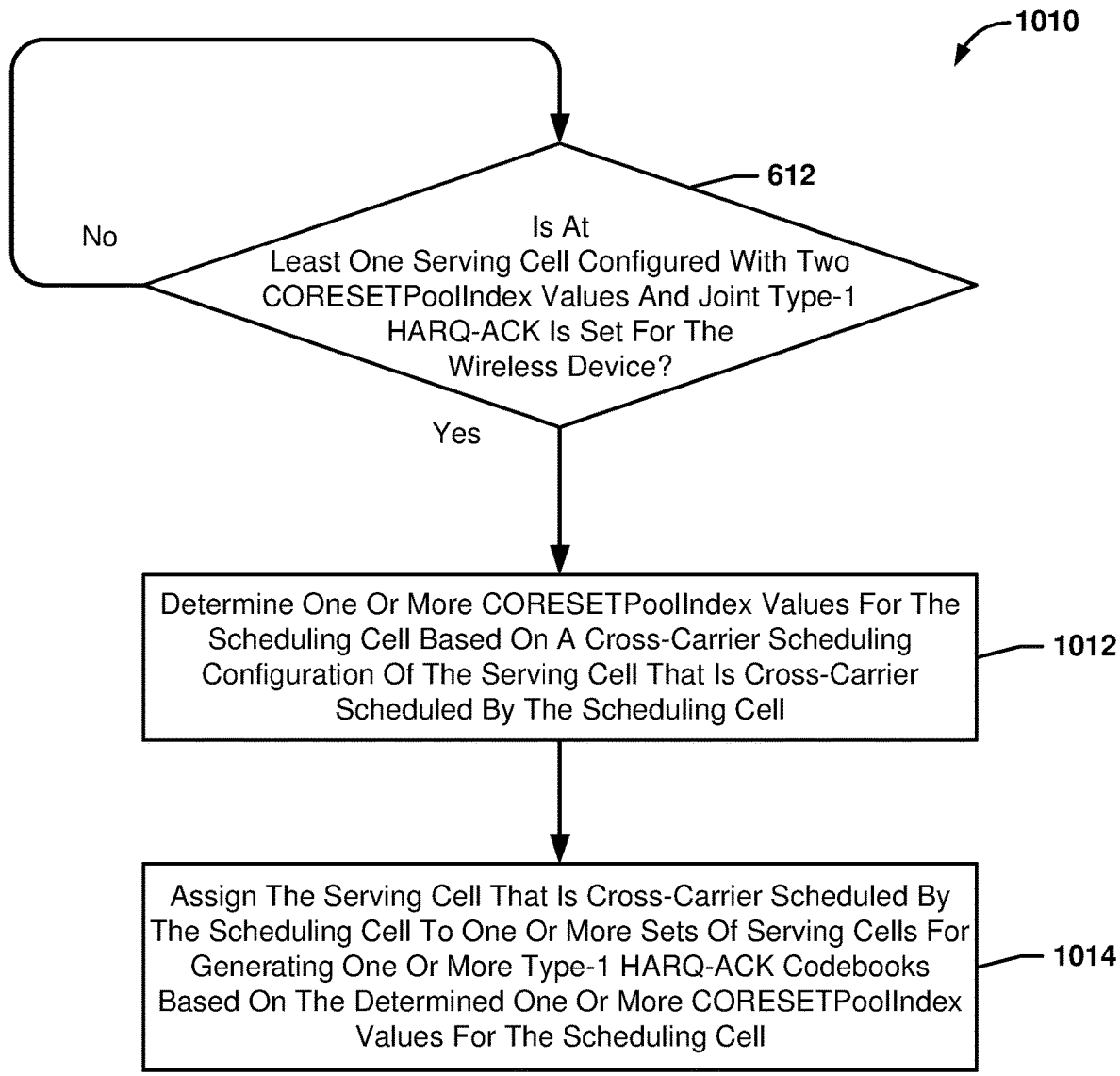
FIG. 10B is a process flow diagram illustrating a method that may be performed by a processor of a wireless device for managing cross-carrier scheduling according to various embodiments.

FIG. 10B is a process flow diagram illustrating a method 1010 that may be performed by a processor of a wireless device for managing cross-carrier scheduling according to various embodiments. With reference to FIGS. 1-10B, the method 1010 may be implemented by a processor (e.g., 212, 216, 252 or 260) of a wireless device (e.g., the wireless device 120a-120e, 120, 200, 320). In various embodiments, the operations of method 1010 may be performed in conjunction with the operations of method 500 (FIG. 5C), method 550 (FIG. 5D), method 600 (FIG. 6A), method 610 (FIG. 6B), method 810 (FIG. 8B), method 820 (FIG. 8C), method 830 (FIG. 8D), and/or method 900 (FIG. 9A). As an example, the operations of method 1010 may be examples of operations performed in block 506 of method 500 (FIG. 5C) to support Type-1 HARQ-ACK operations. With reference to FIGS. 1-10B, means for performing each of the operations of the method 1010 may be one or more processors of a wireless device (e.g., the wireless device 120*a*-120*e*, 120, 200, 320), such as one or more of the processors 212, 216, 252 or 260 and/or the like.

In determination block 612, the processor may perform operations including determining whether at least one serving cell is configured with two CORESETPoolIndex values and joint Type-1 HARQ-ACK is set for the wireless device as discussed with reference to method 610 (FIG. 6B).

In response to determining that no serving cell is configured with two CORESETPoolIndex values or joint Type-1 HARQ-ACK is not set for the wireless device (i.e., determination block 612="No"), the processor may continue to perform operations including determining whether at least one serving cell is configured with two CORESETPoolIndex values and joint Type-1 HARQ-ACK is set for the wireless device in block 612 as discussed with reference to method 610 (FIG. 6B).

In response to determining that at least one serving cell is configured with two CORESETPoolIndex values and joint Type-1 HARQ-ACK is set for the wireless device (i.e., determination block 612="Yes"), the processor may perform operations including determining one or more CORESETPoolIndex values for the scheduling cell based on a cross-carrier scheduling configuration of the serving cell that is cross-carrier scheduled by the scheduling cell in block 1012. In various embodiments, the determining one or more CORESETPoolIndex values for the scheduling cell based on a cross-carrier scheduling configuration of the serving cell that is cross-carrier scheduled by the scheduling cell may be performed for each serving cell that is cross-carrier scheduled by a scheduling cell.

In block 1014, the processor may perform operations including assigning the serving cell that is cross-carrier scheduled by the scheduling cell to one or more sets of serving cells for generating one or more Type-1 HARQ-ACK codebooks based on the determined one or more CORESETPoolIndex values for the scheduling cell.

Figure 10C:
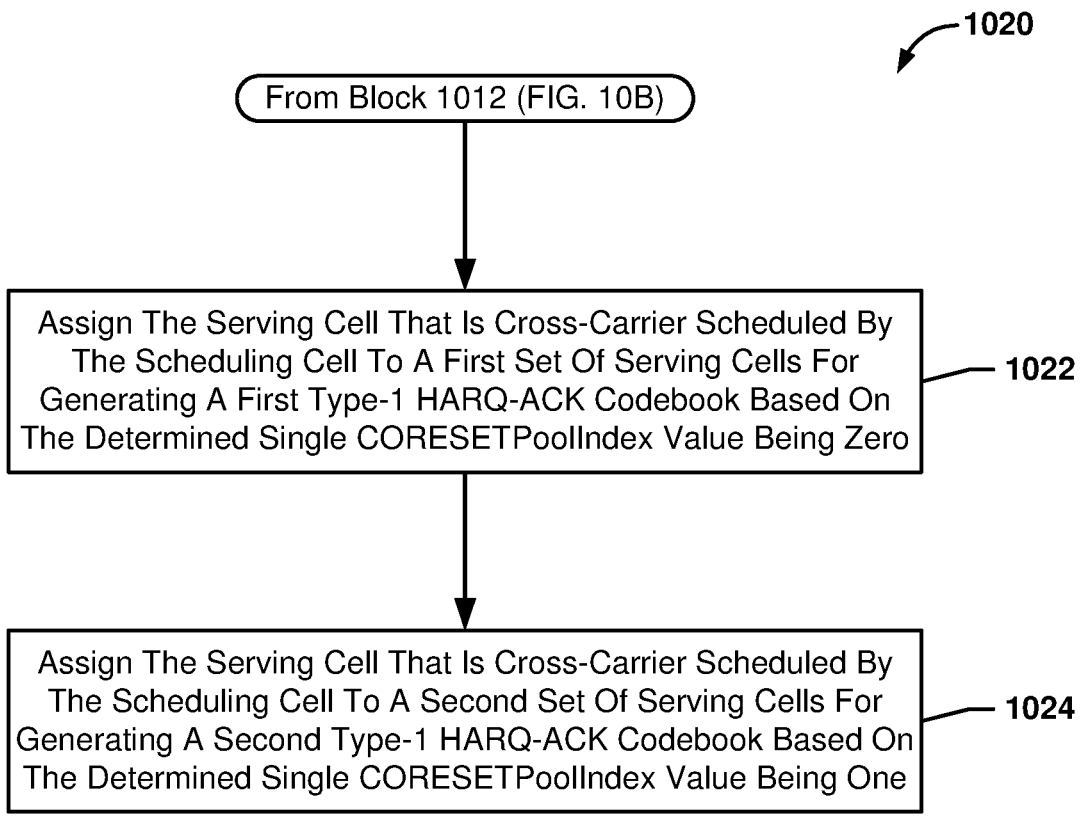
FIG. 10C is a process flow diagram illustrating a method that may be performed by a processor of a wireless device for managing cross-carrier scheduling according to various embodiments.

FIG. 10C is a process flow diagram illustrating a method 1020 that may be performed by a processor of a wireless device for managing cross-carrier scheduling according to various embodiments. With reference to FIGS. 1-10C, the method 1020 may be implemented by a processor (e.g., 212, 216, 252 or 260) of a wireless device (e.g., the wireless device 120*a*-120*e*, 120, 200, 320). In various embodiments, the operations of method 1020 may be performed in conjunction with the operations of method 500 (FIG. 5C), method 550 (FIG. 5D), method 600 (FIG. 6A), method 610 (FIG. 6B), method 810 (FIG. 8B), method 820 (FIG. 8C), method 900 (FIG. 9A), and/or method 1010 (FIG. 10B). For example, the method 1020 may be performed as part of the operations to assign the serving cell that is cross-carrier scheduled by the scheduling cell to the one or more sets of serving cells for generating the one or more Type-1 HARQ-ACK codebooks based on the determined one or more CORESETPoolIndex values for the scheduling cell in block 1014 (FIG. 10B). In some embodiments, the determined one or more CORESETPoolIndex values for the scheduling cell may be a single CORESETPoolIndex value of a value of zero or a value of one. As another example, the operations of method 1020 may be examples of operations performed in block 506 of method 500 (FIG. 5C) to support Type-1 HARQ-ACK operations. With reference to FIGS. 1-10C, means for performing each of the operations of the method 1020 may be one or more processors of a wireless device (e.g., the wireless device 120*a*-120*e*, 120, 200, 320), such as one or more of the processors 212, 216, 252 or 260 and/or the like.

In block 1022, the processor may perform operations including assigning the serving cell that is cross-carrier scheduled by the scheduling cell to a first set of serving cells for generating a first Type-1 HARQ-ACK codebook based on the determined single CORESETPoolIndex value being zero.

In block 1024, the processor may perform operations including assigning the serving cell that is cross-carrier scheduled by the scheduling cell to a second set of serving cells for generating a second Type-1 HARQ-ACK codebook based on the determined single CORESETPoolIndex value being one.

Figure 10D:
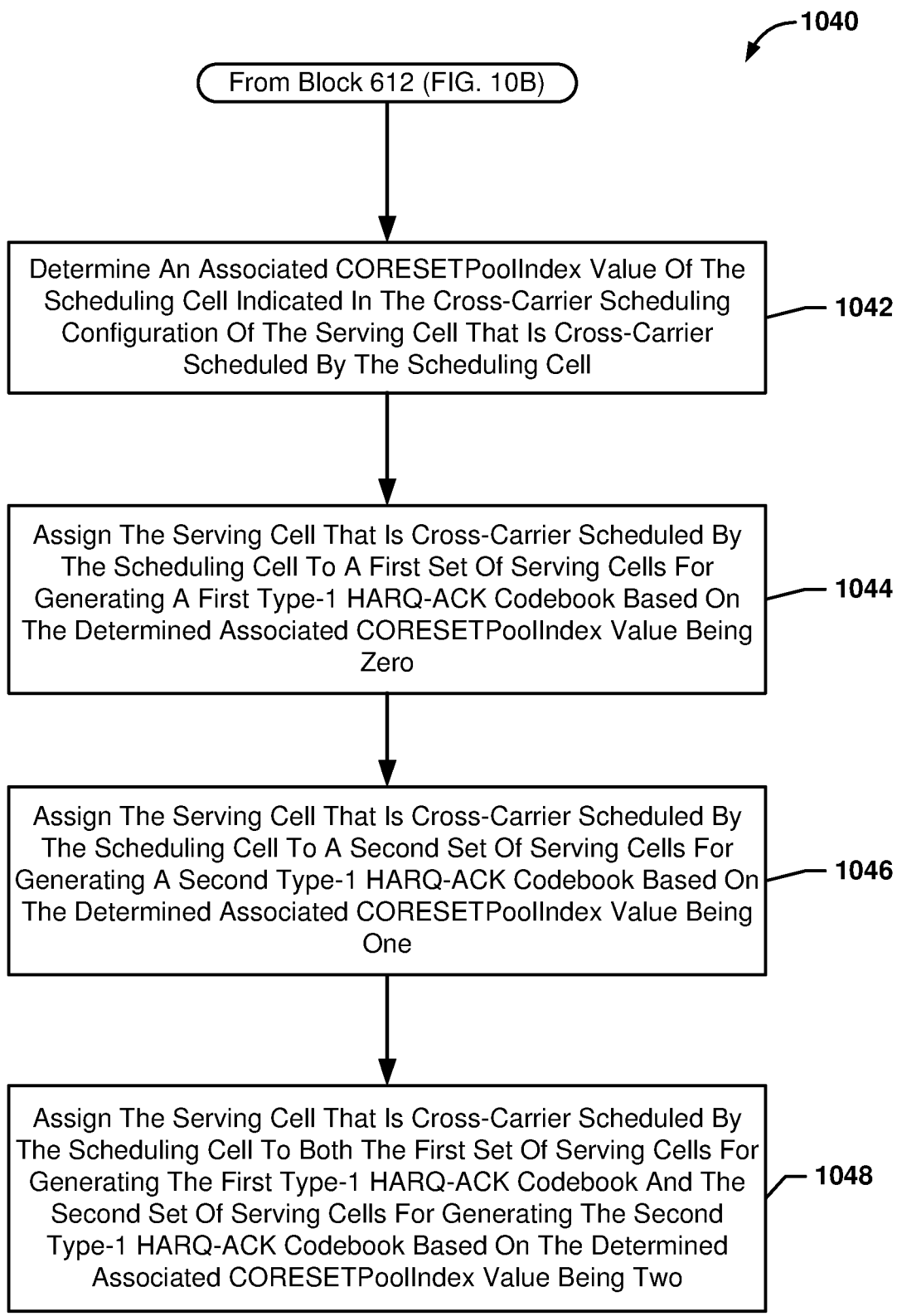
FIG. 10D is a process flow diagram illustrating a method that may be performed by a processor of a wireless device for managing cross-carrier scheduling according to various embodiments.

FIG. 10D is a process flow diagram illustrating a method 1040 that may be performed by a processor of a wireless device for managing cross-carrier scheduling according to various embodiments. With reference to FIGS. 1-10D, the method 1040 may be implemented by a processor (e.g., 212, 216, 252 or 260) of a wireless device (e.g., the wireless device 120*a*-120*e*, 120, 200, 320). In various embodiments, the operations of method 1040 may be performed in conjunction with the operations of method 500 (FIG. 5C), method 550 (FIG. 5D), method 600 (FIG. 6A), method 610 (FIG. 6B), method 810 (FIG. 8B), method 820 (FIG. 8C), method 830 (FIG. 8D), method 900 (FIG. 9A), and/or method 1010 (FIG. 10B). For example, the method 1040 may be performed in response to determining that at least one serving cell is configured with two CORESETPoolIndex values and joint Type-1 HARQ-ACK is set for the wireless device (i.e., determination block 612 (FIG. 10B) ="Yes"). In some embodiments, the operations of method 1040 may be performed to determine the one or more CORESETPoolIndex values for the scheduling cell based on the cross-carrier scheduling configuration of the serving cell that is cross-carrier scheduled by the scheduling cell and assign the serving cell that is cross-carrier scheduled by the scheduling cell to the one or more sets of serving cells for generating the one or more Type-4 HARQ-ACK codebooks based on the determined one or more CORESETPoolIndex values for the scheduling cell. As another example, the operations of method 1040 may be examples of operations performed i in block 506 of method 500 (FIG. 5C) to support Type-1 HARQ-ACK operations. With reference to FIGS. 1-10D, means for performing each of the operations of the method 1040 may be one or more processors of a wireless device (e.g., the wireless device 120*a*-120*e*, 120, 200, 320), such as one or more of the processors 212, 216, 252 or 260 and/or the like.

In block 1042, the processor may perform operations including determining an associated CORESETPoolIndex value of the scheduling cell indicated in the cross-carrier scheduling configuration of the serving cell that is cross-carrier scheduled by the scheduling cell.

In block 1044, the processor may perform operations including assigning the serving cell that is cross-carrier scheduled by the scheduling cell to a first set of serving cells for generating a first Type-1 HARQ-ACK codebook based on the determined associated CORESETPoolIndex value being zero.

In block 1046, the processor may perform operations including assigning the serving cell that is cross-carrier scheduled by the scheduling cell to a second set of serving cells for generating a second Type-1 HARQ-ACK codebook based on the determined associated CORESETPoolIndex value being one.

In block 1048, the processor may perform operations including assigning the serving cell that is cross-carrier scheduled by the scheduling cell to both the first set of serving cells for generating the first Type-1 HARQ-ACK codebook and the second set of serving cells for generating the second Type-1 HARQ-ACK codebook based on the determined associated CORESETPoolIndex value being two.

FIG. 11 illustrates an example of cross-carrier scheduling supporting joint-semi-static HARQ-ACK according to various embodiments. With reference to FIGS. 1-11, FIG. 11 illustrates example joint-semi-static HARQ-ACK operations according to the operations of methods 1010 (FIG. 10B), 1020 (FIG. 10C), and 1040 (FIG. 10D). In FIG. 11, CC0 is as a multi-DCI MTRP cell having two CORESETPoolIndex values configured, CORESETPoolIndex=0 associated with a TRP0 and CORESETPoolIndex=1 associated with a TRP1, and the CC0 is a scheduling cell of another CC1 (i.e., CC1 is a scheduled cell), CC2 (i.e., CC2 is a scheduled cell), and (i.e., CC3 is a scheduled cell). According to the operations of methods 1010 (FIG. 10B), 1020 (FIG. 10C), and 1040 (FIG. 10D), CC1 is associated with CORESETPoolIndex=0, CC2 is associated with CORESETPoolIndex=1, and CC3 is associated with CORESETPoolIndex=0 and CORESETPoolIndex=1. CC1 may be added to list S0 for HARQ-ACK as it is associated with CORESETPoolIndex=0. CC2 may be added to list S1 for HARQ-ACK as it is associated with CORESETPoolIndex=1. CC3 may be added to both list S0 and list S1 for HARQ-ACK as it is associated with both CORESETPoolIndex=0 and CORESETPoolIndex=1. In this manner, CC3 may be handled as a multi-DCI, such as a multi-DCI MTRP cell.

Figure 12:
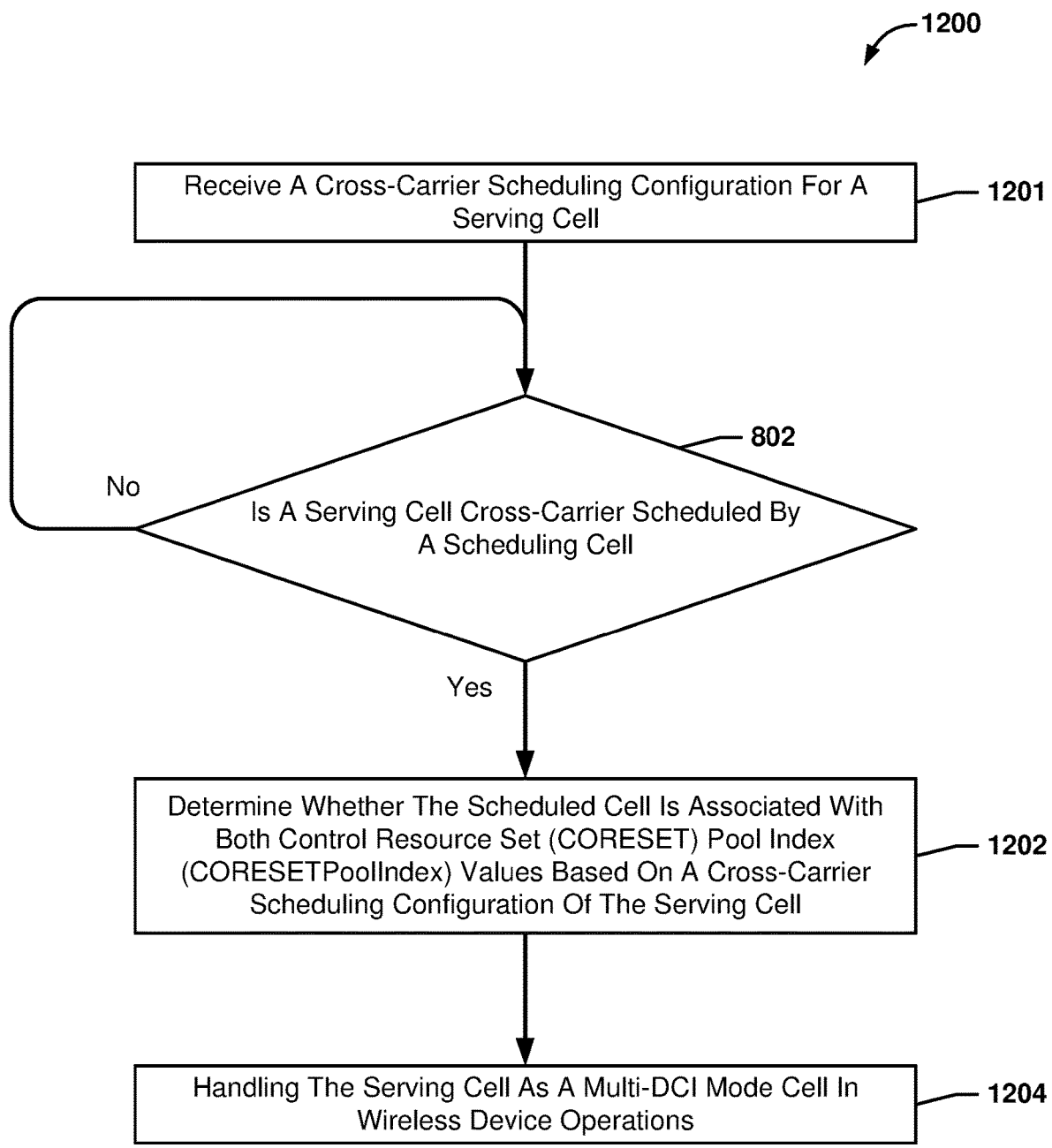
FIG. 12 is a process flow diagram illustrating a method that may be performed by a processor of a wireless device for managing cross-carrier scheduling according to various embodiments.

FIG. 12 is a process flow diagram illustrating a method 1200 that may be performed by a processor of a wireless device for managing cross-carrier scheduling according to various embodiments. With reference to FIGS. 1-12, the method 1200 may be implemented by a processor (e.g., 212, 216, 252 or 260) of a wireless device (e.g., the wireless device 120a-120e, 120, 200, 320). In various embodiments, the operations of method 1200 may be performed in conjunction with the operations of method 500 (FIG. 5C), method 550 (FIG. 5D), method 600 (FIG. 6A), method 610 (FIG. 6B), method 810 (FIG. 8B), method 820 (FIG. 8C), method 830 (FIG. 8D), method 900 (FIG. 9A), method 1010 (FIG. 10B), method 1020 (FIG. 10C), and/or method 1040 (FIG. 10D). As another example, the operations of method 1200 may be examples of operations performed in block 506 of method 500 (FIG. 5C) to support Type-1 HARQ-ACK operations. With reference to FIGS. 1-12, means for performing each of the operations of the method 1200 may be one or more processors of a wireless device (e.g., the wireless device 120a-120e, 120, 200, 320), such as one or more of the processors 212, 216, 252 or 260 and/or the like.

In block 1201, the processor may perform operations including receiving a cross-carrier scheduling configuration for a serving cell. In some embodiments, cross-carrier scheduling configuration for a serving cell may be received in an RRC message. In some embodiments, cross-carrier scheduling configuration elements may indicate whether a serving cell is cross-carrier scheduled by a scheduling cell. For example, values in a CIF and/or an associated CORESETPoolIndexValue element in cross-carrier scheduling configuration may indicate whether or not a serving cell is cross-carrier scheduled by a scheduling cell. In various embodiments, one or more RRC messages including one or more cross-carrier scheduling configurations may be received from a network computing device.

In determination block 802, the processor may perform operations including determining whether a serving cell is cross-carrier scheduled by a scheduling cell as discussed with reference to method 800 (FIG. 8A).

In response to determining that a serving cell is not cross-carrier scheduled by a scheduling cell (i.e., determination block 802="No"), the processor may continue to perform operations including determining whether a serving cell is cross-carrier scheduled by a scheduling cell in determination block 802 as discussed with reference to method 800 (FIG. 8A).

In response to determining that a serving cell is cross-carrier scheduled by a scheduling cell (i.e., determination block 802="Yes"), the processor may perform operations including determining whether the scheduled cell is associated with both CORESETPoolIndex values based on a cross-carrier scheduling configuration of the serving cell in block 1202. For example, the processor may determine whether the scheduled cell is associated with both a CORESETPoolIndex value of zero and a CORESETPoolIndex value of one. In various embodiments, determining whether the scheduled cell is associated with both CORESETPoolIndex values based on the cross-carrier scheduling configuration of the serving cell may include determining whether the scheduled cell has an associated CORESETPoolIndex value of two in the cross-carrier scheduling configuration of the serving cell.

In block 1204, the processor may perform operations including handling the serving cell as a multi-DCI mode cell in wireless device operations. In various embodiments, handling the serving cell as a multi-DCI mode cell in wireless device operations may include adding the serving cell to two HARQ-ACK codebooks. In various embodiments, handling the serving cell as a multi-DCI mode cell in wireless device operations may include counting the serving cell as two serving cells to generate a type-2 HARQ-ACK codebook for the serving cell. In various embodiments, handling the serving cell as a multi-DCI mode cell in wireless device operations may include initializing two scrambling identifiers for a physical downlink shared channels (PDSCHs) in the serving cell. In various embodiments, handling the serving cell as a multi-DCI mode cell in wireless device operations may include configuring two lists of cell-specific reference signal (CRS) rate matching patterns in the serving cell. In various embodiments, handling the serving cell as a multi-DCI mode cell in wireless device operations may include supporting out-of-order operations for the serving cell. In various embodiments, handling the serving cell as a multi-DCI mode cell in wireless device operations may include associating two lists of active transmission configuration indicator (TCI) states with the serving cell. In various embodiments, handling the serving cell as a multi-DCI mode cell in wireless device operations may include including the serving cell in a list of serving cells provided with CORESETPoolIndex values of both zero and one for calculating physical downlink control channel (PDDCH) candidates and/or non-overlapped control channel element (CCE) limits.

Figure 13:
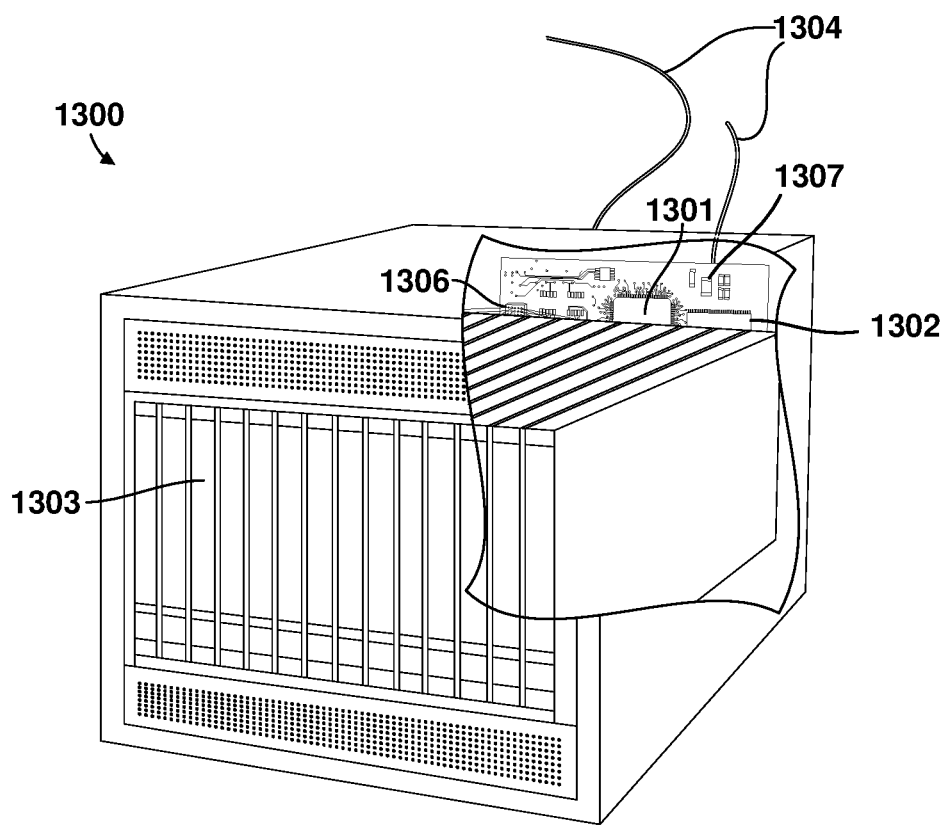
FIG. 13 is a component block diagram of an example network computing device.

FIG. 13 shows a component block diagram of an example network computing device 1300. In some embodiments, the wireless network computing device 1300 may function as a network element of a communication network, such as a base station (e.g., base station 110a-e, 110, 350). The network computing device 1300 may include at least the components illustrated in FIG. 13. With reference to FIGS. 1-13, the network computing device 1300 may typically include a processor 1301 coupled to volatile memory 1302 and a large capacity nonvolatile memory, such as a disk drive 1303. The network computing device 1300 also may include a peripheral memory access device such as a floppy disc drive, compact disc (CD) or digital video disc (DVD) drive 1306 coupled to the processor 1301. The network computing device 1300 also may include network access ports 1304 (or interfaces) coupled to the processor 1301 for establishing data connections with a network, such as the Internet or a local area network coupled to other system computers and servers. The network computing device 1300 may include one or more antennas 1307 for sending and receiving electromagnetic radiation that may be connected to a wireless communication link. The network computing device 1300 may include additional access ports, such as USB, Firewire, Thunderbolt, and the like for coupling to peripherals, external memory, or other devices.

Figure 14:
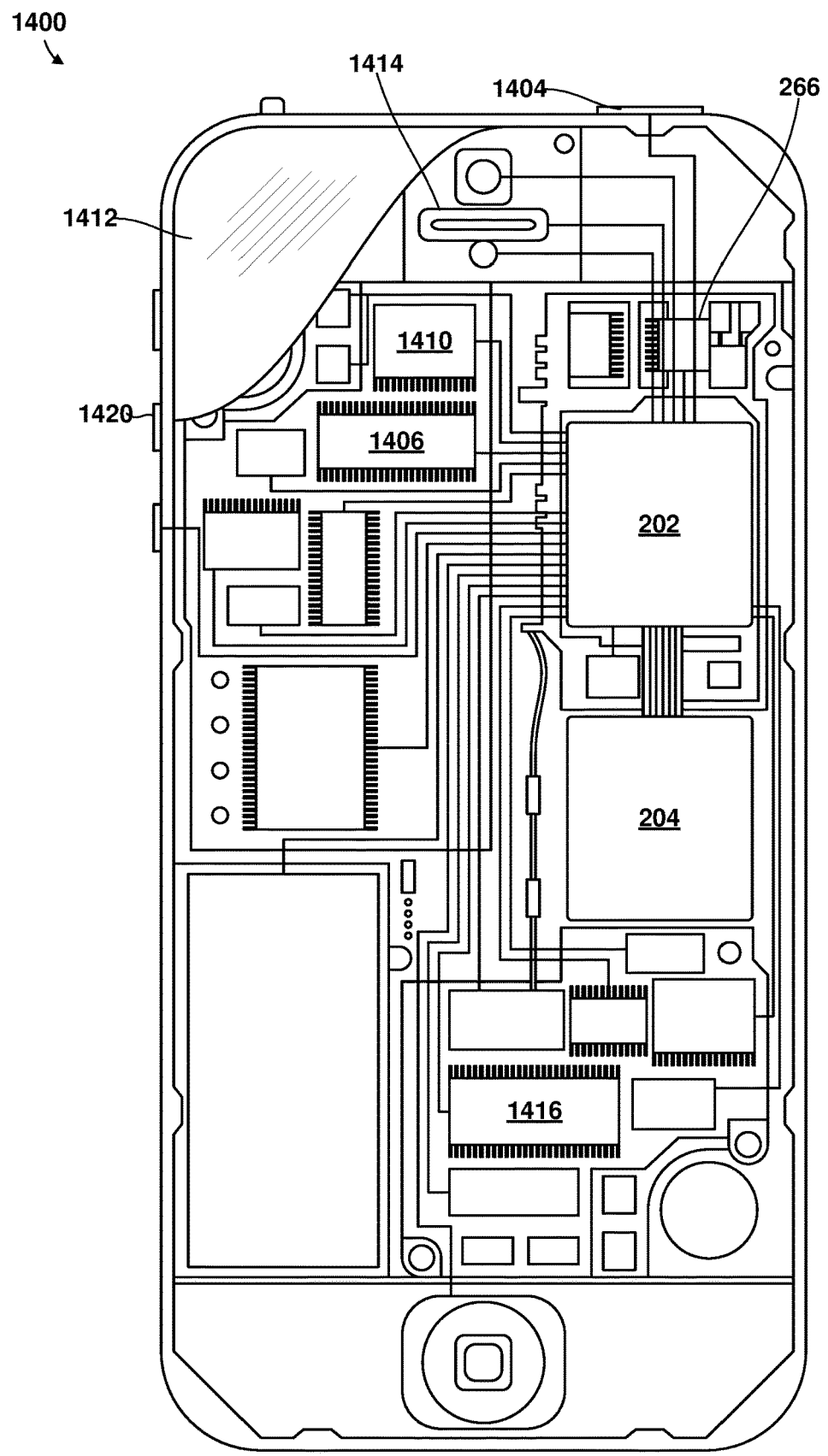
FIG. 14 is a component block diagram of an example wireless device.

FIG. 14 shows a component block diagram of an example wireless device. In some embodiments, the wireless device may be implemented as a variety of wireless devices (for example, the wireless device 120a-120e, 120, 200, 320), an example of which is illustrated in FIG. 14 in the form of a smartphone 1400. The smartphone 1400 may include a first SOC 202 (for example, a SOC-CPU) coupled to a second SOC 204 (for example, a 5G capable SOC). The first and second SOCs 202, 204 may be coupled to internal memory 1406, 1416, a display 1412, and to a speaker 1414. Additionally, the smartphone 1400 may include an antenna 1404 for sending and receiving electromagnetic radiation that may be connected to a wireless data link or wireless transceiver 266 (e.g., a cellular telephone transceiver, etc.) coupled to one or more processors in the first or second SOCs 202, 204. Smartphones 1400 typically also include menu selection buttons or rocker switches 1420 for receiving user inputs.

A typical smartphone 1400 also includes a sound encoding/decoding (CODEC) circuit 1410, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1410 may include a digital signal processor (DSP) circuit (not shown separately).

The processors of the wireless network computing device 1300 and the smartphone 1400 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 550, 600, 610, 800, 810, 820, 830, 900, 1000, 1010, 1020, 1040, and/or 1200, may be substituted for or combined with one or more operations of the methods 500, 550, 600, 610, 800, 810, 820, 830, 900, 1000, 1010, 1020, 1040, and/or 1200.

Implementation examples are described in the following paragraphs. While some of the following implementation examples are described in terms of example methods, further example implementations may include: the example methods discussed in the following paragraphs implemented by a wireless device including a processor configured to perform operations of the example methods; the example methods discussed in the following paragraphs implemented by a wireless device including means for performing functions of the example methods; and the example methods discussed in the following paragraphs implemented as a non-transitory processor-readable storage medium having stored thereon processor-executable instructions configured to cause a processor of a wireless device to perform the operations of the example methods.

Example 1. A method of managing cross-carrier scheduling by a processor of a wireless device, including: receiving downlink control information (DCI) from a scheduling cell that schedules a communication on a scheduled cell; transmitting the communication or monitoring for the communication on the scheduled cell based on the DCI; and performing Type-1 hybrid automatic repeat request (HARQ) acknowledgement (HARQ-ACK) operations for the communication based on one or more Control Resource Set (CORESET) pools configured for the scheduled cell.

Example 2. The method of example 1, further including receiving a cross-carrier scheduling configuration of the scheduling cell indicating the one or more CORESET pools.

Example 3. The method of any of examples 1-2, in which in response to the cross-carrier scheduling configuration indicating two CORESET pools, performing Type-1 HARQ-ACK operations for the communication based on the one or more CORESET pools configured for the scheduled cell includes: performing Type-1 HARQ-ACK operations for the communication on a first CORESET pool including the scheduled cell based on a CORESET pool of the scheduling cell being indicated as the first CORESET pool; or performing Type-1 HARQ-ACK operations for the communication on a second CORESET pool including the scheduled cell based on the CORESET pool of the scheduling cell being indicated as the second CORESET pool.

Example 4. The method of any of examples 1-2, in which in response to the cross-carrier scheduling configuration indicating two CORESET pools of the scheduling cell, performing Type-1 HARQ-ACK operations for the communication based on the one or more CORESET pools configured for the scheduled cell includes performing Type-1 HARQ-ACK operations for the communication on a first CORESET pool of the two CORESET pools based on the first CORESET pool being a default CORESET pool, the first CORESET pool including the scheduled cell.

Example 5. The method of any of examples 1-2, in which in response to the cross-carrier scheduling configuration indicating two CORESET pools of the scheduling cell and a selected CORESET pool of the two CORESET pools associated with the scheduled cell, performing Type-1 HARQ-ACK operations for the communication based on the one or more CORESET pools configured for the scheduled cell includes performing Type-1 HARQ-ACK operations for the communication on the selected CORESET pool based on the indication in the cross-carrier scheduling configuration, the selected CORESET pool including the scheduled cell.

Example 6. The method of any of examples 1-2, in which in response to the cross-carrier scheduling configuration indicates two CORESET pools of the scheduling cell and an association of the schedule cell with both CORESET pools, performing Type-1 HARQ-ACK operations for the communication based on the one or more CORESET pools configured for the scheduled cell includes performing Type-1 HARQ-ACK operations for the communication on both CORESET pools based on the indication in the cross-carrier scheduling configuration of the association with both CORESET pools, both CORESET pools including the scheduled cell.

Example 7. The method of any of examples 1-6, further including: handling the schedule cell as a multi-downlink control information (DCI) (multi-DCI) mode cell in wireless device operations based on the indication in the cross-carrier scheduling configuration of the association with both CORESET pools.

Example 8. The method of example 7, in which handling the schedule cell as a multi-DCI mode cell in wireless device operations includes counting the schedule cell as two serving cells to generate a type-2 HARQ-ACK codebook for the schedule cell.

Example 9. The method of any of examples 7-8, in which handling the schedule cell as a multi-DCI mode cell in wireless device operations includes initializing two scrambling identifiers for physical downlink shared channels (PDSCHs) in the schedule cell.

Example 10. The method of any of examples 7-9, in which handling the schedule cell as a multi-DCI mode cell in wireless device operations includes configuring two lists of cell-specific reference signal (CRS) rate matching patterns in the schedule cell.

Example 11. The method of any of examples 7-10, in which handling the schedule cell as a multi-DCI mode cell in wireless device operations includes supporting out-of-order operations for the schedule cell.

Example 12. The method of any of examples 7-11, in which handling the schedule cell as a multi-DCI mode cell in wireless device operations includes associating two lists of active transmission configuration indicator (TCI) states with the schedule cell.

Example 13. The method of any of examples 7-12, in which handling the schedule cell as a multi-DCI mode cell in wireless device operations includes including the schedule cell in a list of serving cells provided with CORESET-PoolIndex values of both zero and one for calculating physical downlink control channel (PDDCH) candidates and/or non-overlapped control channel element (CCE) limits.

Example 14. The method of any of examples 1-13, in which the cross-carrier scheduling configuration is received in a radio resource control (RRC) message.

Example 15. The method of example 14, in which the one or more CORESET pools are indicated by one or more Control Resource Set (CORESET) Pool Index (CORESET-PoolIndex) values.

Example 16. A method of managing cross-carrier scheduling by a processor of a network computing device, including: transmitting a cross-carrier scheduling configuration of a scheduled cell to a wireless device, wherein the cross-carrier scheduling configuration indicates one or more associated Control Resource Set (CORESET) pools of a scheduling cell configured to schedule the scheduled cell; transmitting downlink control information (DCI) for the scheduled cell from the scheduling cell to the wireless device; and receiving joint feedback from the wireless device for Type-1 hybrid automatic repeat request (HARQ) acknowledgement (HARQ-ACK) operations for a communication associated with scheduled cell.

Example 17. The method of example 16, in which the associated one or more CORESET pools are indicated by one or more CORESET Pool Index (CORESETPoolIndex) values.

Example 18. The method of any of examples 16-17, in which the cross-carrier scheduling configuration indicates a single of the one or more associated CORESET pools of the scheduling cell is the CORESET pool of the scheduled cell.

Example 19. The method of any of examples 16-18, in which the cross-carrier scheduling configuration indicates a two of the one or more associated CORESET pools of the scheduling cell are both CORESET pools of the scheduled cell.

Example 20. The method of any of examples 16-19, in which the cross-carrier scheduling configuration is transmitted to the wireless device in a radio resource control (RRC) message.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing cross-carrier scheduling by a processor of a wireless device, comprising:
receiving a cross-carrier scheduling configuration of a scheduling cell indicating two Control Resource Set (CORESET) pools configured for a scheduled cell;
receiving downlink control information (DCI) from the scheduling cell that schedules a communication on the scheduled cell;
transmitting the communication or monitoring for the communication on the scheduled cell based on the DCI; and
performing Type-1 hybrid automatic repeat request (HARQ) acknowledgement (HARQ-ACK) operations for the communication on both CORESET pools, both CORESET pools including the scheduled cell.

2. The method of claim 1, further comprising:
handling the scheduled cell as a multi-downlink control information (DCI) (multi-DCI) mode cell in wireless device operations based on the indication in the cross-carrier scheduling configuration of the association with both CORESET pools.

3. The method of claim 2, wherein handling the scheduled cell as a multi-DCI mode cell in wireless device operations comprises counting the scheduled cell as two serving cells to generate a type-2 HARQ-ACK codebook for the scheduled cell.

4. The method of claim 2, wherein handling the scheduled cell as a multi-DCI mode cell in wireless device operations comprises initializing two scrambling identifiers for physical downlink shared channels (PDSCHs) in the scheduled cell.

5. The method of claim 2, wherein handling the scheduled cell as a multi-DCI mode cell in wireless device operations comprises configuring two lists of cell-specific reference signal (CRS) rate matching patterns in the scheduled cell.

6. The method of claim 2, wherein handling the scheduled cell as a multi-DCI mode cell in wireless device operations comprises supporting out-of-order operations for the scheduled cell.

7. The method of claim 2, wherein handling the scheduled cell as a multi-DCI mode cell in wireless device operations comprises associating two lists of active transmission configuration indicator (TCI) states with the scheduled cell.

8. The method of claim 2, wherein handling the scheduled cell as a multi-DCI mode cell in wireless device operations comprises including the scheduled cell in a list of serving cells provided with CORESETPoolIndex values of both zero and one for calculating physical downlink control channel (PDDCH) candidates and/or non-overlapped control channel element (CCE) limits.

9. The method of claim 1, wherein the cross-carrier scheduling configuration is received in a radio resource control (RRC) message.

10. The method of claim 9, wherein both CORESET pools are indicated by respective Control Resource Set (CORESET) Pool Index (CORESETPoolIndex) values.

11. The method of claim 1, wherein both CORESET pools are indicated by respective Control Resource Set (CORESET) Pool Index (CORESETPoolIndex) values.

12. A method of managing cross-carrier scheduling by a processor of a network computing device, comprising:
  transmitting a cross-carrier scheduling configuration of a scheduled cell to a wireless device, wherein the cross-carrier scheduling configuration indicates one or more associated Control Resource Set (CORESET) pools of a scheduling cell configured to schedule the scheduled cell, wherein the cross-carrier scheduling configuration indicates two of the one or more associated CORESET pools of the scheduling cell are both CORESET pools of the scheduled cell;
  transmitting downlink control information (DCI) for the scheduled cell from the scheduling cell to the wireless device; and
  receiving joint feedback from the wireless device for Type-1 hybrid automatic repeat request (HARQ) acknowledgement (HARQ-ACK) operations for a communication associated with scheduled cell.

13. The method of claim 12, wherein the associated one or more CORESET pools are indicated by one or more CORESET Pool Index (CORESETPoolIndex) values.

14. The method of claim 13, wherein the cross-carrier scheduling configuration is transmitted to the wireless device in a radio resource control (RRC) message.

15. The method of claim 12, wherein the cross-carrier scheduling configuration is transmitted to the wireless device in a radio resource control (RRC) message.

16. A wireless device, comprising:
  a radio resource; and
  a processor connected to the radio resource, the processor configured to:
    receive a cross-carrier scheduling configuration of a scheduling cell indicating two Control Resource Set (CORESET) pools configured for a scheduled cell;
    receive downlink control information (DCI) from scheduling cell that schedules a communication on the scheduled cell;
    transmit the communication or monitor for the communication on the scheduled cell based on the DCI; and
    perform Type-1 hybrid automatic repeat request (HARQ) acknowledgement (HARQ-ACK) operations for the communication on both CORESET pools, both CORESET pools including the scheduled cell.

17. The wireless device of claim 16, wherein the processor is further configured to handle the scheduled cell as a multi-downlink control information (DCI) (multi-DCI) mode cell in wireless device operations based on the indication in the cross-carrier scheduling configuration of the association with both CORESET pools.

18. The wireless device of claim 17, wherein the processor is further configured to handle the scheduled cell as a multi-DCI mode cell in wireless device operations by counting the scheduled cell as two serving cells to generate a type-2 HARQ-ACK codebook for the scheduled cell.

19. The wireless device of claim 17, wherein the processor is further configured to handle the scheduled cell as a multi-DCI mode cell in wireless device operations by initializing two scrambling identifiers for physical downlink shared channels (PDSCHs) in the scheduled cell.

20. The wireless device of claim 17, wherein the processor is further configured to handle the scheduled cell as a multi-DCI mode cell in wireless device operations by configuring two lists of cell-specific reference signal (CRS) rate matching patterns in the scheduled cell.

21. The wireless device of claim 17, wherein the processor is further configured to handle the scheduled cell as a multi-DCI mode cell in wireless device operations by supporting out-of-order operations for the scheduled cell.

22. The wireless device of claim 17, wherein the processor is further configured to handle the scheduled cell as a multi-DCI mode cell in wireless device operations comprises associating two lists of active transmission configuration indicator (TCI) states with the scheduled cell.

23. The wireless device of claim 17, wherein the processor is further configured to handle the scheduled cell a multi-DCI mode cell in wireless device operations by including the scheduled cell in a list of serving cells provided with CORESETPoolIndex values of both zero and one for calculating physical downlink control channel (PDDCH) candidates and/or non-overlapped control channel element (CCE) limits.

24. The wireless device of claim 16, wherein the cross-carrier scheduling configuration is received in a radio resource control (RRC) message.

25. The wireless device of claim 24, wherein both CORESET pools are indicated by respective Control Resource Set (CORESET) Pool Index (CORESETPoolIndex) values.

26. The network computing device of claim 25, wherein the cross-carrier scheduling configuration is transmitted to the wireless device in a radio resource control (RRC) message.

27. The wireless device of claim 16, wherein both CORESET pools are indicated by respective Control Resource Set (CORESET) Pool Index (CORESETPoolIndex) values.

28. A network computing device, comprising:
  a radio resource; and
  a processor connected to the radio resource, the processor configured to:
    transmit a cross-carrier scheduling configuration of a scheduled cell to a wireless device, wherein the cross-carrier scheduling configuration indicates one or more associated Control Resource Set (CORESET) pools of a scheduling cell configured to schedule the scheduled cell, wherein the cross-carrier scheduling configuration indicates a two of the one or more associated CORESET pools of the scheduling cell are both CORESET pools of the scheduled cell;
    transmit downlink control information (DCI) for the scheduled cell from the scheduling cell to the wireless device; and
    receive joint feedback from the wireless device for Type-1 hybrid automatic repeat request (HARQ) acknowledgement (HARQ-ACK) operations for a communication associated with scheduled cell.

29. The network computing device of claim 28, wherein:
the associated one or more CORESET pools are indicated by one or more CORESET Pool Index (CORESET-PoolIndex) values.

30. The network computing device of claim 28, wherein the cross-carrier scheduling configuration is transmitted to the wireless device in a radio resource control (RRC) message.

\* \* \* \* \*